United States Patent
Huang et al.

(10) Patent No.: US 11,695,516 B2
(45) Date of Patent: Jul. 4, 2023

(54) METHOD AND APPARATUS FOR HANDLING DEVICE-TO-DEVICE FEEDBACK IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/012,437

(22) Filed: Sep. 4, 2020

(65) Prior Publication Data

US 2021/0075552 A1  Mar. 11, 2021

Related U.S. Application Data

(60) Provisional application No. 62/897,568, filed on Sep. 9, 2019.

(51) Int. Cl.
*H04L 1/1812* (2023.01)
*H04W 64/00* (2009.01)
(Continued)

(52) U.S. Cl.
CPC .......... *H04L 1/1812* (2013.01); *H04W 64/00* (2013.01); *H04W 72/121* (2013.01); *H04W 72/20* (2023.01); *H04W 92/18* (2013.01)

(58) Field of Classification Search
CPC .. H04L 1/1812; H04W 64/00; H04W 72/121; H04W 72/1278
See application file for complete search history.

(56) References Cited

U.S. PATENT DOCUMENTS

| 2004/0002346 A1* | 1/2004 | Santhoff | H04B 17/309 |
| | | | 455/456.1 |
| 2009/0227271 A1* | 9/2009 | Lee | H04W 4/02 |
| | | | 455/456.6 |

(Continued)

OTHER PUBLICATIONS

3GPP "Physical layer procedure for NR V2X sidelink communication" Intel Corporation, R1-1906799, May 13-17, 2019, Reno, USA (Year: 2019).*

(Continued)

*Primary Examiner* — Kevin M Cunningham
(74) *Attorney, Agent, or Firm* — Cooper Legal Group LLC

(57) ABSTRACT

In an example, a second UE receives a first SCI and a second SCI from a first UE in a first slot. A groupcast sidelink transmission is scheduled by the first SCI and the second SCI. The second SCI indicates a location indication, associated with a location of the first UE, and a communication range. A PSFCH resource is determined based upon the first SCI. The second UE doesn't transmit a NACK indication on the PSFCH resource if location information of the second UE is available, the groupcast sidelink transmission isn't successfully decoded, and the second UE is outside the communication range. The second UE transmits the NACK indication on the PSFCH resource if the location information isn't available and the groupcast sidelink transmission isn't successfully decoded, or if the location information is available, the groupcast sidelink transmission isn't successfully decoded, and the second UE is within the communication range.

22 Claims, 8 Drawing Sheets

(51) Int. Cl.
*H04W 72/121* (2023.01)
*H04W 72/20* (2023.01)
*H04W 92/18* (2009.01)

(56) References Cited

U.S. PATENT DOCUMENTS

| | | | | |
|---|---|---|---|---|
| 2010/0136985 A1* | 6/2010 | Inoue | ................. | H04W 16/08 |
| | | | | 455/446 |
| 2020/0274649 A1* | 8/2020 | Lee | ................. | H04W 80/02 |
| 2020/0323023 A1* | 10/2020 | Miao | ................. | H04W 28/04 |
| 2020/0344722 A1* | 10/2020 | He | ................. | H04W 72/0446 |
| 2020/0366422 A1* | 11/2020 | Nguyen | ................. | H04W 4/025 |
| 2021/0068071 A1* | 3/2021 | Wu | ................. | H04W 76/11 |

OTHER PUBLICATIONS

3rd Generation Partnership Project, 3GPP, RAN1 #97, North American Friends of 3GPP.
"NR V2X Sidelink Physical Layer Procedures", Intel Corporation, 3GPP TSG RAN WG1 Meeting #98, R1-1908638, Agenda Item 7.2.4.5, Document for Discussion and Decision, Prague, Czech Republic, Aug. 26 -30, 2019.
"Physical layer procedures for NR V2X sidelink communication", Intel Corporation, 3GPP TSG RAN WG1 Meeting #97 R1-1906799, Agenda Item 7.2.4.5, Document for Discussion and Decision, Reno, USA, May 13-17, 2019.
"Further Study on Tx-Rx Distance based HARQ Feedback", Fujitsu, 3GPP TSG RAN WG1 #96b R1-1905378, Agenda Item 7.2.4.5, Document for Discussion and Decision, Xian, China, Apr. 8-12, 2019.
"Design of physical layer procedures for NR V2X sidelink communication", Intel Corporation, 3GPP TSG RAN WG1 RAN1#96bis R1-1904299, Agenda Item 7.2.4.5, Document for Discussion and Decision, Xi'an, China, Apr. 8-12, 2019.
Corresponding European Patent Application No. 20194634.0, Extended European Search Report, dated Feb. 8, 2021.
"Sidelink Physical Layer Procedures for NR V2X", IHuawei HiSilicon, 3GPP TSG RAN WG1 Meeting #98, R1-1908040, Agenda Item 7.2.4.5, Document for Discussion and Decision, Prague, Czech Republic, Aug. 26-30, 2019.
"Physical layer procedure for NR sidelink", Vivo, 3GPP TSG RAN WG1 Meeting #98, R1-1908154, Agenda Item 7.2.4.5, Document for Discussion and Decision, Prague, Czech Republic, Aug. 26-30, 2019.
"Sidelink Physical Layer Structure", Kyocera, 3GPP TSG RAN WG1 #98 R1-1909015, Agenda Item 7.2.4.1, Document for Discussion and Decision,Prague, Czech Republic, Aug. 26-30, 2019.
Corresponding European Patent Application No. 20194634.0, Communication Pursuant to Article 94(3) dated Dec. 9, 2021.

* cited by examiner

US 11,695,516 B2

METHOD AND APPARATUS FOR HANDLING DEVICE-TO-DEVICE FEEDBACK IN A WIRELESS COMMUNICATION SYSTEM

CROSS-REFERENCE TO RELATED APPLICATIONS

The present application claims the benefit of U.S. Provisional Patent Application Ser. No. 62/897,568 filed on Sep. 9, 2019, the entire disclosure of which is incorporated herein in its entirety by reference.

FIELD

This disclosure generally relates to wireless communication networks, and more particularly, to a method and apparatus for handling device-to-device feedback in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. A method of a second User Equipment (UE) for performing Hybrid Automatic Repeat Request (HARQ) feedback in response to a groupcast sidelink transmission for a group is provided. In an example, the second UE receives, in a first slot, a first sidelink control information (SCI) and a second SCI from a first UE. The groupcast sidelink transmission is scheduled by the first SCI and the second SCI. The second SCI is indicative of a location indication, associated with a location of the first UE, and a communication range. A Physical Sidelink Feedback Channel (PSFCH) resource is determined based upon the first SCI. The second UE does not transmit a non-acknowledgement (NACK) indication on the PSFCH resource if a location information of the second UE is available, the groupcast sidelink transmission is not successfully decoded, and the second UE is outside the communication range from the first UE. The second UE transmits the NACK indication on the PSFCH resource if the location information of the second UE is not available and the groupcast sidelink transmission is not successfully decoded. The second UE transmits the NACK indication on the PSFCH resource if the location information of the second UE is available, the groupcast sidelink transmission is not successfully decoded, and the second UE is within the communication range from the first UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based upon code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.213 V15.4.0 (2018-12), "E-UTRA; Physical layer procedures (Release 15)"; 3GPP TS 36.212 V15.4.0 (2018-12), "E-UTRA); Physical layer; Multiplexing and channel coding (Release 15)"; 3GPP TS 36.211 V15.4.0 (2018-12), "E-UTRA); Physical layer; Physical channels and modulation (Release 15)"; 3GPP TS 36.214 V15.3.0 (2018-09), "E-UTRA); Physical layer; Measurements (Release 15)"; RP-182111, "Revised SID: Study on NR V2X", LG Electronics; R1-1810051, Final Report of 3GPP TSG RAN WG1 #94 v1.0.0 (Gothenburg, Sweden, 20-24 Aug. 2018); R1-1812101, Final Report of 3GPP TSG RAN WG1 #94bis v1.0.0 (Chengdu, China, 8-12 Oct. 2018); R1-1901482, Final Report of 3GPP TSG RAN WG1 #95 v0.1.0 (Spokane, USA, 12-16 Nov. 2018); R1-1901483, Final Report of 3GPP TSG RAN WG1 #AH_1901 v1.0.0 (Taipei, Taiwan, 21-25 Jan. 2019); R1-1905837, Final Report of 3GPP TSG RAN WG1 #96 v2.0.0 (Athens, Greece, 25 Feb.-1 Mar. 2019); R1-1905921, Final Report of 3GPP TSG RAN WG1 #96bis v1.0.0 (Xi'an, China, 8-12 Apr. 2019); Draft Report of 3GPP TSG RAN WG1 #97 v0.1.0 (Reno, USA, 13-17 May 2019); Draft Report of 3GPP TSG RAN WG1 #98 v0.1.0 (Prague, Czech, 26-30 Aug. 2019). The standards and documents listed above are hereby expressly incorporated by reference in their entirety.

Figure 1:
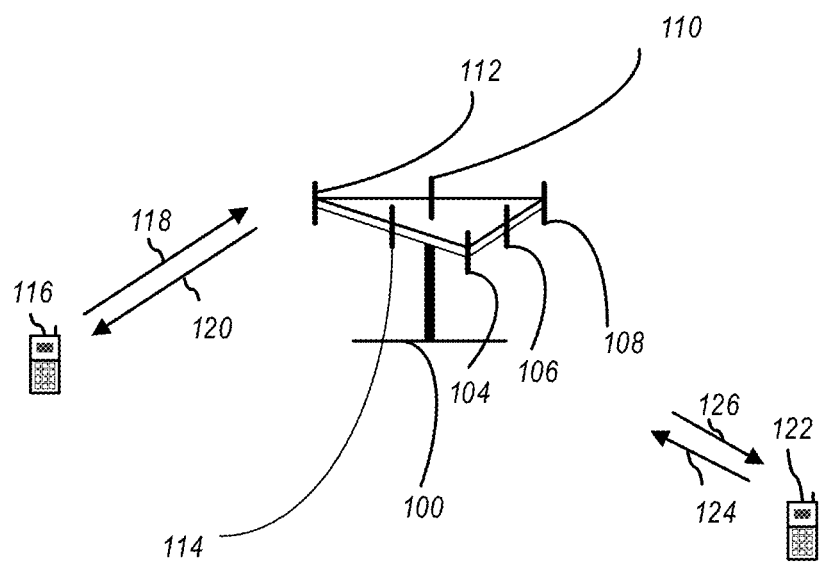
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
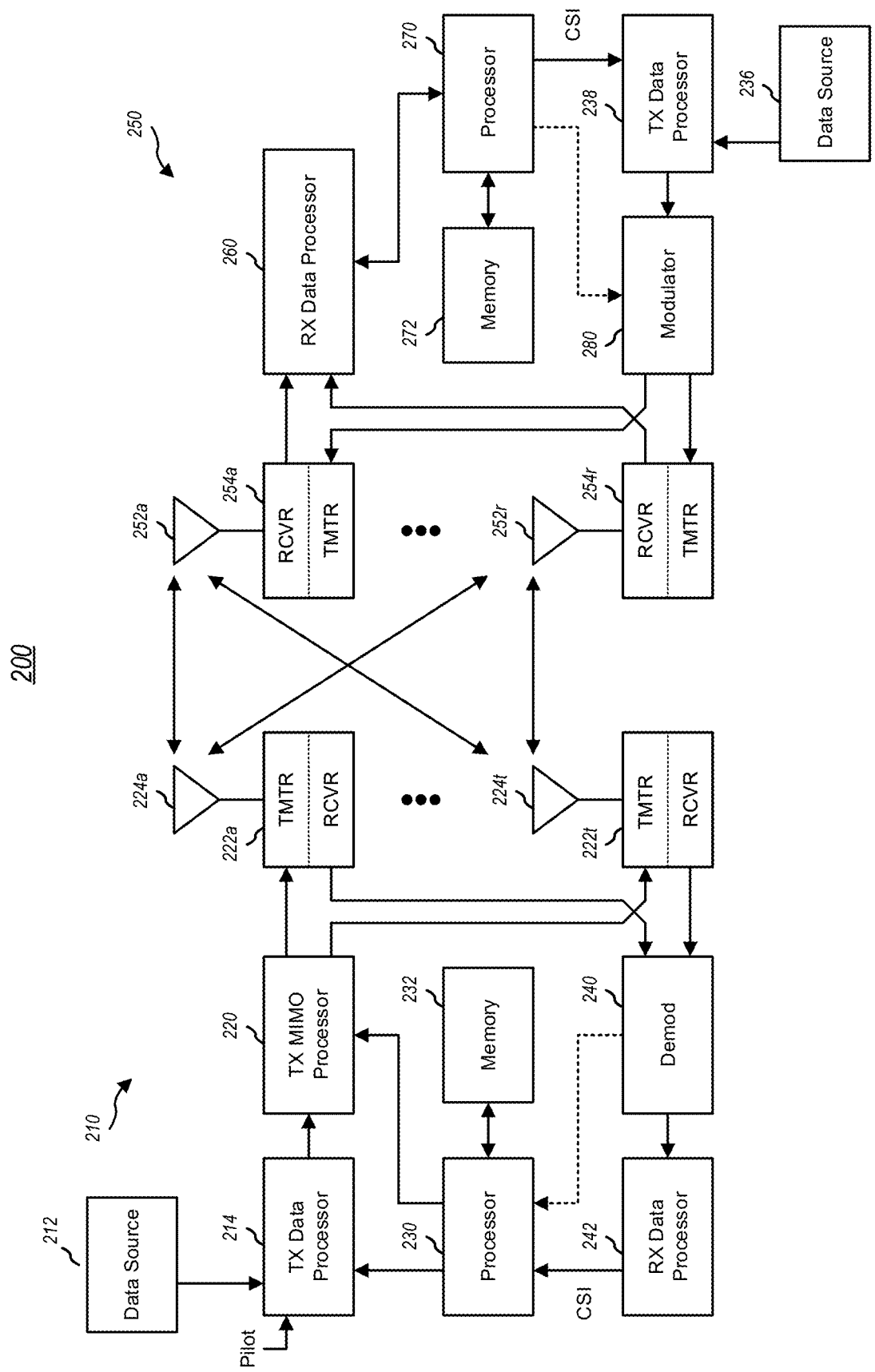
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based upon a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based upon a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based upon a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
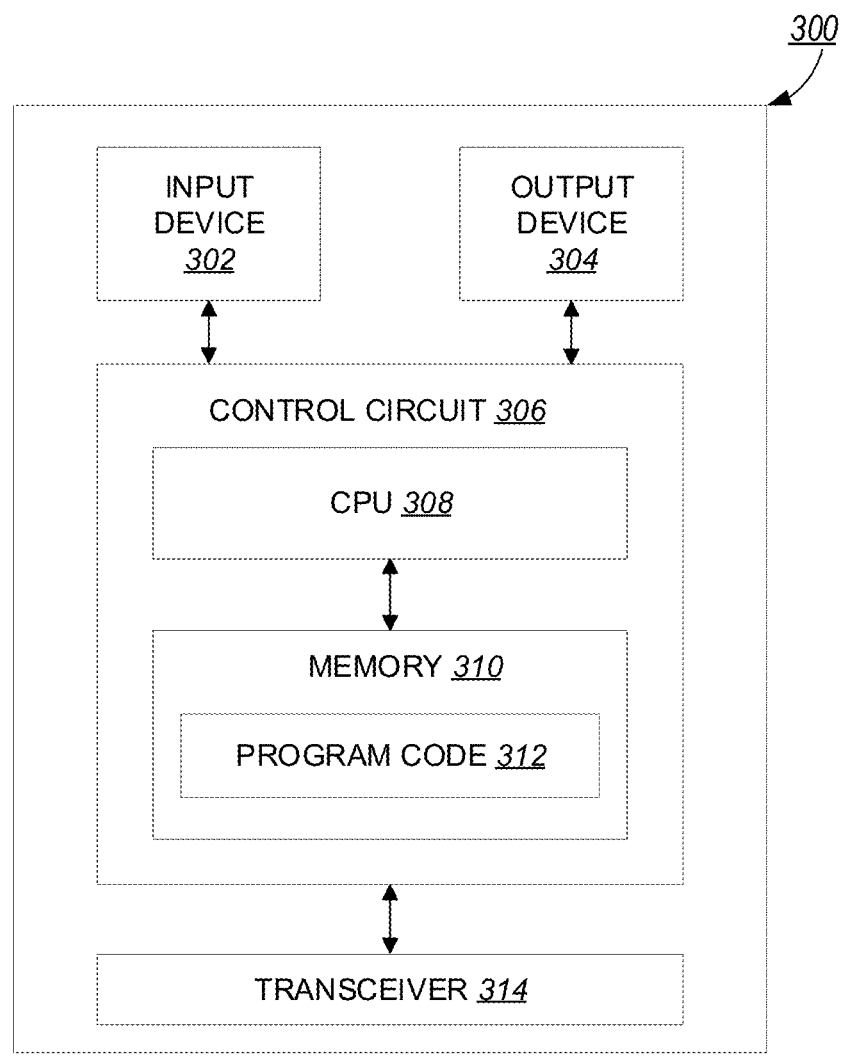
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
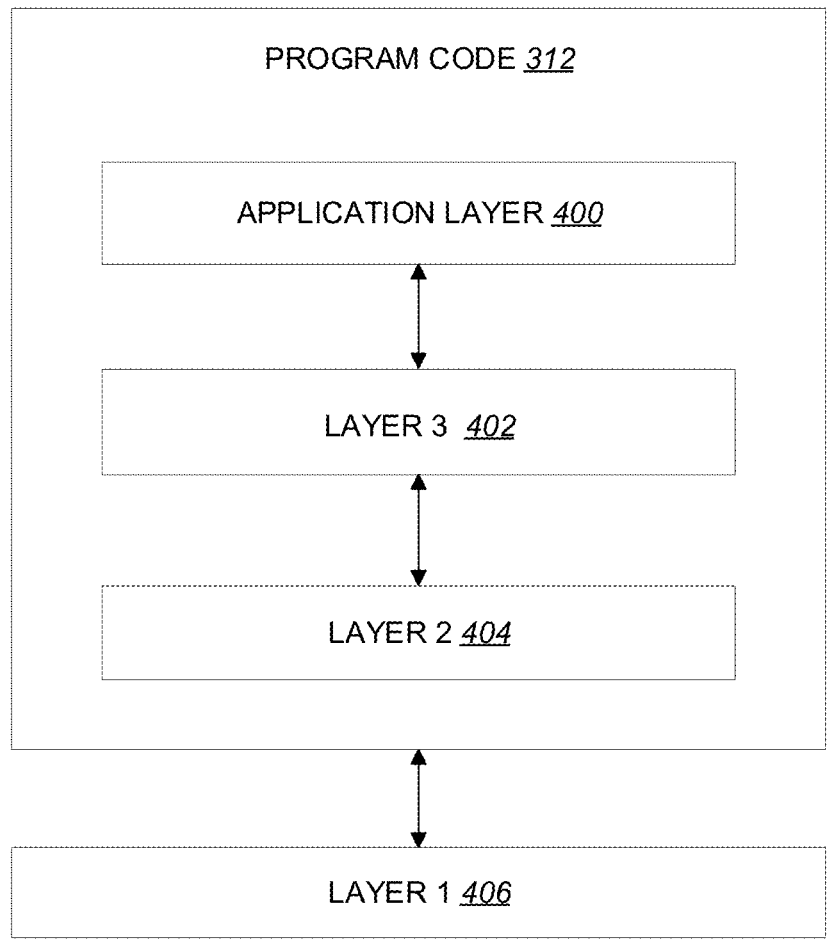
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 36.213 V15.4.0 (2018-12) specifies a UE procedure for Vehicle-to-Everything (V2X) transmission in LTE and/or LTE-A. The V2X transmission is performed as sidelink transmission mode 3 or sidelink transmission mode 4. Parts of 3GPP TS 36.213 V15.4.0 (2018-12) are quoted below:

14 UE Procedures Related to Sidelink
14.1 Physical Sidelink Shared Channel Related Procedures
14.1.1 UE Procedure for Transmitting the PSSCH
[ ... ]
If the UE transmits SCI format 1 on PSCCH according to a PSCCH resource configuration in subframe n, then for the corresponding PSSCH transmissions of one TB
  for sidelink transmission mode 3,
    the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.
  for sidelink transmission mode 4,
    the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.
[ ... ]
14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3
In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}$
=10*SL_RESOURCE_RESELECTION_COUNTER,
where
SL_RESOURCE_RESELECTION_COUNTER is provided by higher layers [11].

If partial sensing is not configured by higher layers then the following steps are used:
1) A candidate single-subframe resource for PSSCH transmission $R_{x,y}$ is defined as a set of $L_{subCH}$ contiguous sub channels with sub channel x+j in subframe $t_y^{SL}$ where j=0, ..., $L_{subCH}$-1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$. UE selection of $T_2$ shall fulfil the latency requirement. The total number of the candidate single-subframe resources is denoted by $M_{total}$.
2) The UE shall monitor subframes $t_{n'-10 \times P_{step}}^{SL}$, $t_{n'-10 \times P_{step}+1}^{SL}$, ..., $t_{n'-1}^{SL}$ except for those in which its transmissions occur, where $t_{n'}^{SL}$=n if subframe n belongs to the set ($t_0^{SL}$, $t_1^{SL}$, ..., $t_{T_{max}}^{SL}$), otherwise subframe $t_{n'}^{SL}$ is the first subframe after subframe n belonging to the set ($t_0^{SL}$, $t_1^{SL}$, ..., $t_{T_{max}}^{SL}$). The UE shall perform the behaviour in the following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
  the UE has not monitored subframe $t_z^{SL}$ in Step 2.
  there is an integer j which meets y+j×$P_{rsvp\_TX}'$=z+$P_{step}$×k×q where j=0 q, 1, ..., $C_{resel}$-1 $P_{rsvp\_TX}'$=$P_{step}$×$P_{rsvp\_TX}$/100, k is any value allowed by the higher layer parameter restrictResourceReservationPeriod and q=1, 2, ..., Q. Here, $$Q = \frac{1}{k}$$

if k<1 and n'-z≤$P_{step}$×k, where $t_{n'}^{SL}$=n if subframe n belongs to the set $t_0^{SL}$, $t_1^{SL}$, ..., $t_{T_{max}}^{SL}$, otherwise subframe $t_{n'}^{SL}$, is the first subframe belonging to the set $t_0^{SL}$, $t_1^{SL}$, ..., $t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX},prio_{RX}}$.

the SCI format received in subframe tor the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}$ for q=1, 2, . . . , Q and j=0, 1, . . . , $C_{resel}$−1. Here, $$Q = \frac{1}{P_{rsvp\_RX}}$$

if $P_{rsvp\_RX}$<1 and n'−m≤$P_{step} \times P_{rsvp\_RX}$, where $t_{n'}^{SL}$=n if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step} \cdot j}^{SL}$ for a non-negative integer j if $P_{rsvp\_TX}$≥100, and $t_{y-P_{rsvp\_TX} \cdot j}^{SL}$ for a non-negative integer j otherwise.

9) The UE moves the candidate single-subframe resource $R_{x,y}$ with the smallest metric $E_{x,y}$, from the set $S_A$ to $S_B$. This step is repeated until the number of candidate single-subframe resources in the set $S_B$ becomes greater than or equal to 0.2·$M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

[ . . . ]

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

PDCCH/EPDCCH configured by SL-V-RNTI or SL-SPS-V-RNTI

| DCI format | Search Space |
| --- | --- |
| DCI format 5A | For PDCCH: Common and UE specific by C-RNTI<br>For EPDCCH: UE specific by C-RNTI |

The carrier indicator field value in DCI format 5A corresponds to v2x-InterFreqInfo.

14.2.1 UE Procedure for Transmitting the PSCCH

[ . . . ]

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4 + m) \times 10^{-3}.$$

$L_{init}$ is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{Re\_TX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe n+$k_{init} \cdot L_{Re\_TX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+S_{gap}}^{SL}$ where $SF_{gap}$ is the value indicated by "Time gap between initial transmission and retransmission" field in the configured sidelink grant, $L_{ReTX}$ corresponds to the value $n_{subCE}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

TABLE 14.2.1-1

Mapping of DCI format 5A offset field to indicated value m

| SL index field in DCI format 5A | Indicated value m |
|---|---|
| '00' | 0 |
| '01' | 1 |
| '10' | 2 |
| '11' | 3 |

TABLE 14.2.1-2

Determination of the Resource reservation field in SCI format 1

| Resource reservation field in SCI format 1 | Indicated value X | Condition |
|---|---|---|
| '0001', '0010', . . . , '1010' | Decimal equivalent of the field | The higher layer decides to keep the resource for the transmission of the next transport block and the value X meets 1 ≤ X ≤ 10. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.214 V15.3.0 (2018-09) specifies some measurements for sidelink transmission in LTE and/or LTE-A. Parts of 3GPP TS 36.214 V15.3.0 (2018-09) are quoted below:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

NOTE:
The power per resource element is determined from the energy received during the useful part of the symbol, excluding the CP.

5.1.30 Channel Busy Ratio (CBR)

| | |
|---|---|
| Definition | Channel busy ratio (CBR) measured in subframe n is defined as follows:<br>For PSSCH, the portion of sub-channels in the resource pool whose S-RSSI measured by the UE exceed a (pre-)configured threshold sensed over subframes [n − 100, n − 1];<br>For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two consecutive PRB pairs in the frequency domain. |
| Applicable for | RRC_IDLE intra-frequency,<br>RRC_IDLE inter-frequency,<br>RRC_CONNECTED intra-frequency,<br>RRC_CONNECTED inter-frequency |

NOTE:
The subframe index is based on physical subframe index

5.1.31 Channel Occupancy Ratio (CR)

| | |
|---|---|
| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
| Applicable for | RRC_IDLE intra-frequency,<br>RRC_IDLE inter-frequency,<br>RRC_CONNECTED intra-frequency,<br>RRC_CONNECTED inter-frequency |

3GPP TS 36.212 V15.4.0 (2018-12) specifies Cyclic Redundancy Check (CRC) attachment for downlink shared channel and downlink control information in LTE and/or LTE-A. The downlink shared channel and downlink control information are for communication between network node and UE, i.e. Uu link. The sidelink shared channel and sidelink control information are for communication between UEs, i.e. PC5 link and/or sidelink. Parts of 3GPP TS 36.212 V15.4.0 (2018-12) are quoted below:

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$\lceil \log_2 (N_{subchannel}^{SL}) \rceil$ bits as defined in subclause 14.1.1.4C of [3].

SCI format 1 fields according to 5.4.3.1.2:
Frequency resource location of initial transmission and retransmission.
Time gap between initial transmission and retransmission.

SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:
SL SPS configuration index—3 bits as defined in subclause 14.2.1 of [3].
Activation/release indication—1 bit as defined in subclause 14.2.1 of [3].
[ . . . ]

5.4.3.1.2 SCI Format 1

SCI format 1 is used for the scheduling of PSSCH.

The following information is transmitted by means of the SCI format 1:

Priority—3 bits as defined in subclause 4.4.5.1 of [7].

Resource reservation—4 bits as defined in subclause 14.2.1 of [3].

Frequency resource location of initial transmission and retransmission—$\lceil \log_2 (N_{subchannel}^{SL}(N_{subchannel}^{SL}+1)/2) \rceil$ bits as defined in subclause 14.1.1.4C of [3].

Time gap between initial transmission and retransmission—4 bits as defined in subclause 14.1.1.4C of [3].

Modulation and coding scheme—5 bits as defined in subclause 14.2.1 of [3].

Retransmission index—1 bit as defined in subclause 14.2.1 of [3].

Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 V15.4.0 (2018-12) specifies generation for physical sidelink shared channel and physical sidelink control channel in LTE and/or LTE-A. The physical sidelink shared channel and physical sidelink control channel are for communication between devices, i.e. PC5 link and/or device-to-device link.

The physical sidelink shared channel (PSSCH) delivers data and/or transport blocks for sidelink shared channel (SL-SCH).

The physical sidelink control channel (PSCCH) delivers sidelink control information (SCI).

Parts of 3GPP TS 36.211 V15.4.0 (2018-12) are quoted below:

9 Sidelink 9.1.1 Physical Channels

Figure 5:
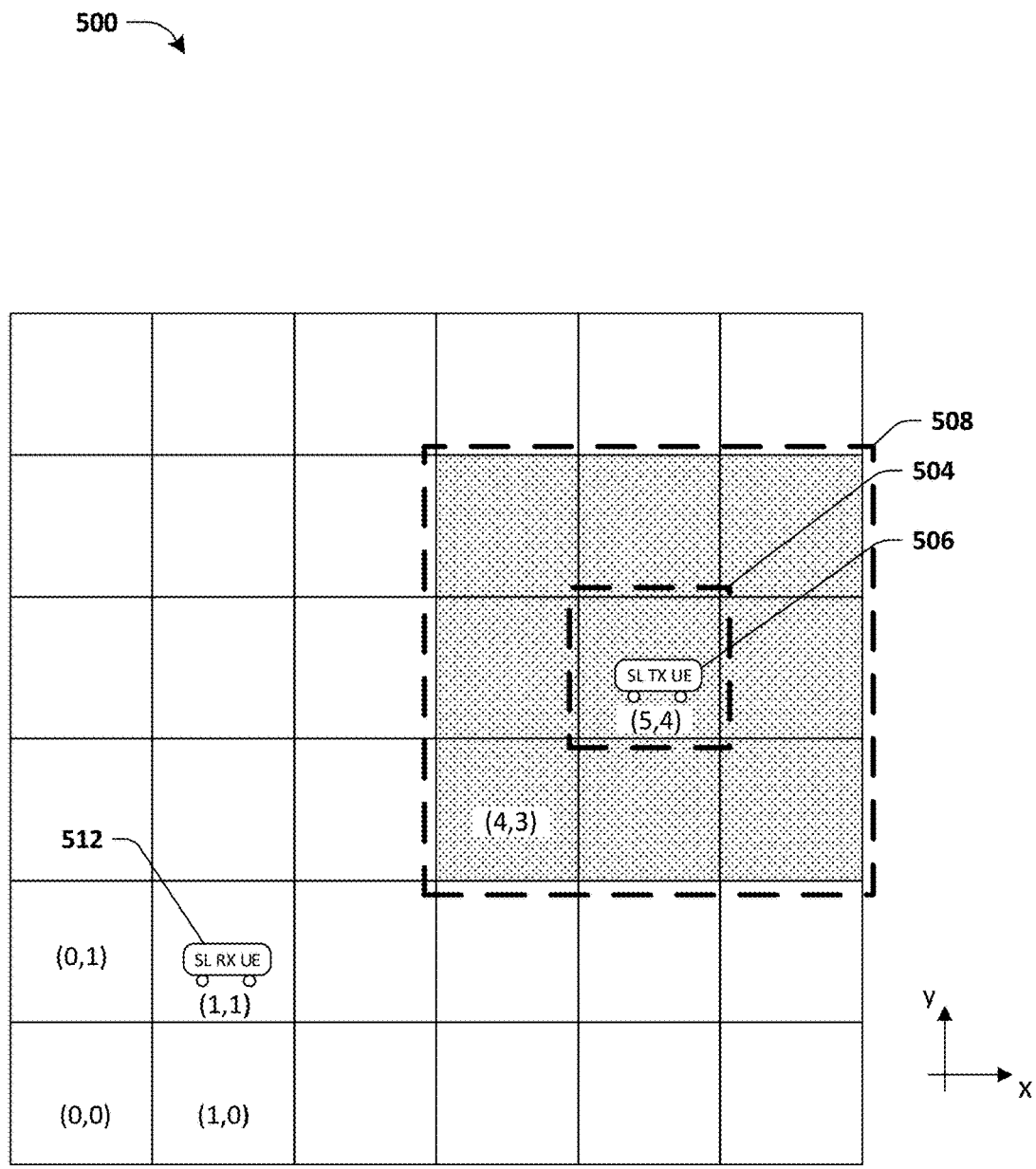
FIG. 5 is a diagram illustrating an exemplary scenario associated with a first UE and/or a second UE according to one exemplary embodiment.

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH
Physical Sidelink Control Channel, PSCCH
Physical Sidelink Discovery Channel, PSDCH
Physical Sidelink Broadcast Channel, PSBCH Generation of the baseband signal representing the different physical sidelink channels is illustrated in FIG. 5.3-1.
[ . . . ]

RP-182111 specifies the Justification and objective of study item on NR Vehicle-to-Everything (V2X). Parts of RP-182111 are quoted below:

3 Justification

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In RAN1 #94 meeting, RAN1 has some agreements about NR V2X. Parts of R1-1810051 including at least some of the agreements are quoted below:

Agreements:
RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to.

RAN1 assumes that the physical layer knows the following information for a certain transmission belonging to a unicast or groupcast session.
  ID
    Groupcast: destination group ID
    Unicast: destination ID
    HARQ process ID
[ ... ]
Agreements:
  At least PSCCH and PSSCH are defined for NR V2X. PSCCH at least carries information necessary to decode PSSCH.
[ ... ]
Agreements:
RAN1 to continue study on multiplexing physical channels considering at least the above aspects:
  Multiplexing of PSCCH and the associated PSSCH (here, the "associated" means that the PSCCH at least carries information necessary to decode the PSSCH).
    Study further the following options:
      Option 3: A part of PSCCH and the associated PSSCH are transmitted using overlapping time resources in non-overlapping frequency resources, but another part of the associated PSSCH and/or another part of the PSCCH are transmitted using non-overlapping time resources.
[ ... ]
Agreements:
  At least two sidelink resource allocation modes are defined for NR-V2X sidelink communication
    Mode 1: Base station schedules sidelink resource(s) to be used by UE for sidelink transmission(s)
    Mode 2: UE determines (i.e. base station does not schedule) sidelink transmission resource(s) within sidelink resources configured by base station/network or pre-configured sidelink resources
Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
  a) UE autonomously selects sidelink resource for transmission
  b) UE assists sidelink resource selection for other UE(s)
  c) UE is configured with NR configured grant (type-1 like) for sidelink transmission
  d) UE schedules sidelink transmissions of other UEs In RAN1 #94bis meeting, RAN1 has some agreements about NR V2X. Parts of R1-1812101 including at least some of the agreements are quoted below:
Agreements:
  Layer-1 destination ID is conveyed via PSCCH.
  Additional Layer-1 ID(s) is conveyed via PSCCH at least for the purpose of identifying which transmissions can be combined in reception when HARQ feedback is in use.
Agreements:
  For unicast, sidelink HARQ feedback and HARQ combining in the physical layer are supported.
  For groupcast, sidelink HARQ feedback and HARQ combining in the physical layer are supported.

Agreements:
  Sidelink control information (SCI) is defined.
    SCI is transmitted in PSCCH.
    SCI includes at least one SCI format which includes the information necessary to decode the corresponding PSSCH.
    NDI, if defined, is a part of SCI.
  Sidelink feedback control information (SFCI) is defined.
    SFCI includes at least one SFCI format which includes HARQ-ACK for the corresponding PSSCH.

In RAN1 #95 meeting, RAN1 has some agreements about NR V2X. Parts of R1-1901482 including at least some of the agreements are quoted below:
Working Assumption:
  Regarding PSCCH/PSSCH multiplexing, at least option 3 is supported for CP-OFDM.
    RAN1 assumes that transient period is not needed between symbols containing PSCCH and symbols not containing PSCCH in the supported design of option 3.
Agreements:
  Physical sidelink feedback channel (PSFCH) is defined and it is supported to convey SFCI for unicast and groupcast via PSFCH.
Agreements:
  When SL HARQ feedback is enabled for unicast, the following operation is supported for the non-CBG case:
    Receiver UE generates HARQ-ACK if it successfully decodes the corresponding TB. It generates HARQ-NACK if it does not successfully decode the corresponding TB after decoding the associated PSCCH which targets the receiver UE.
Agreements:
  It is supported to enable and disable SL HARQ feedback in unicast and groupcast.

In RAN1 #AH_1901 meeting, RAN1 has some agreements about NR V2X. Parts of R1-1901483 including at least some of the agreements are quoted below:
Agreements:
  Layer-1 destination ID can be explicitly included in SCI
  The following additional information can be included in SCI
    Layer-1 source ID
    HARQ process ID
    NDI
    RV
Agreements:
  For determining the resource of PSFCH containing HARQ feedback, support that the time gap between PSSCH and the associated PSFCH is not signaled via PSCCH at least for modes 2(a)(c)(d) (if respectively supported)
Working Assumption:
  When HARQ feedback is enabled for groupcast, support (options as identified in RAN1 #95):
    Option 1: Receiver UE transmits only HARQ NACK
    Option 2: Receiver UE transmits HARQ ACK/NACK
Agreements:
  (Pre-)configuration indicates whether SL HARQ feedback is enabled or disabled in unicast and/or groupcast.
Agreements:
  Mode-2 supports the sensing and resource (re)-selection procedures according to the previously agreed definitions.

Agreements:
  SCI decoding applied during sensing procedure provides at least information on sidelink resources indicated by the UE transmitting the SCI
In RAN1 #96 meeting, RAN1 has some agreements about NR V2X. Parts of R1-1905837 including at least some of the agreements are quoted below:
Agreements:
  For the operation regarding PSSCH, a UE performs either transmission or reception in a slot on a carrier.
  NR sidelink supports for a UE:
    A case where all the symbols in a slot are available for sidelink
    Another case where only a subset of consecutive symbols in a slot is available for sidelink
      Note: this case is not intended to be used for the ITS spectra, if there is no forward-compatibility issue. Finalize in the WI phase whether there is such an issue or not
    The subset is NOT dynamically indicated to the UE
Agreements:
  At least for sidelink HARQ feedback, NR sidelink supports at least a PSFCH format which uses last symbol(s) available for sidelink in a slot.
Agreements:
  (Pre-)configuration indicates the time gap between PSFCH and the associated PSSCH for Mode 1 and Mode 2.
In RAN1 #96bis meeting, RAN1 has some agreements about NR V2X. Parts of R1-1905921 including at least some of the agreements are quoted below:
Agreements:
  At least for transmission perspective of a UE in a carrier, at least TDM between PSCCH/PSSCH and PSFCH is allowed for a PSFCH format for sidelink in a slot.
Agreements:
  It is supported, in a resource pool, that within the slots associated with the resource pool, PSFCH resources can be (pre)configured periodically with a period of N slot(s)
    N is configurable, with the following values
      1
      At least one more value≥1
        FFS details
    The configuration should also include the possibility of no resource for PSFCH. In this case, HARQ feedback for all transmissions in the resource pool is disabled
  HARQ feedback for transmissions in a resource pool can only be sent on PSFCH in the same resource pool
In RAN1 #97 meeting, RAN1 has some agreements about NR V2X. Parts of Draft Report of 3GPP TSG RAN WG1 #97 v0.1.0 including at least some of the agreements are quoted below:
  Conclusion:
    If two-stage SCI is supported, the following details are used.
      Information related to channel sensing is carried on 1st-stage.
      2nd-stage is decoded by using PSSCH DMRS.
      Polar coding used for PDCCH is applied to 2nd-stage
      Payload size for 1st-stage in two-stage SCI case is the same for unicast, groupcast, and broadcast in a resource pool.
      After decoding the 1st-stage, the receiver does not need to perform blind decoding of 2nd-stage.

Agreements:
  Sub-channel size is (pre)configurable.
Agreements:
  Sidelink HARQ ACK/NACK report from transmitter UE to gNB is supported with details FFS.
    Note: this reverts the following agreement from RAN1 #96:
      Sidelink HARQ ACK/NACK report from UE to gNB is not supported in Rel-16.
  SR/BSR report to gNB for the purpose of requesting resources for HARQ retransmission is not supported.
Agreements:
  Support a sub-channel as the minimum granularity in frequency domain for the sensing for PSSCH resource selection
Agreements:
  For the period of N slot(s) of PSFCH resource, N=2 and N=4 are additionally supported.
Agreements:
  For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.
Agreements:
  At least for the case when the PSFCH in a slot is in response to a single PSSCH:
    Implicit mechanism is used to determine at least frequency and/or code domain resource of PSFCH, within a configured resource pool. At least the following parameters are used in the implicit mechanism:
      Slot index (FFS details) associated with PSCCH/PSSCH/PSFCH
      Sub-channel(s) (FFS details) associated with PSCCH/PSSCH
      Identifier (FFS details) to distinguish each RX UE in a group for Option 2 groupcast HARQ feedback
In RAN1 #98 meeting, RAN1 has some agreements about NR V2X. Parts of Draft Report of 3GPP TSG RAN WG1 #98 v0.1.0 including at least some of the agreements are quoted below:
Agreements:
  Support 2-stage SCI
    $1^{st}$ SCI is carried in PSCCH.
Working Assumption:
  An indication of a priority of a sidelink transmission is carried by SCI payload
    This indication is used for sensing and resource (re)selection procedures
    This priority is not necessarily the higher layer priority
Agreements:
  The resource (re-)selection procedure includes the following steps
    Step 1: Identification of candidate resources within the resource selection window
    Step 2: Resource selection for (re-)transmission(s) from the identified candidate resources
Agreements:
  In Step 1 of the resource (re-)selection procedure, a resource is not considered as a candidate resource if:
    The resource is indicated in a received SCI and the associated L1 SL-RSRP measurement is above an SL-RSRP threshold
      The SL-RSRP threshold is at least a function of the priority of the SL transmission indicated in the received SCI and the priority of the transmission for which resources are being selected by the UE Agreements:
  For PSSCH-to-HARQ feedback timing, to down-select:
    Option 1: K is the number of logical slots (i.e., the slots within the resource pool)
    Option 2: K is the number of physical slots (i.e., the slots within and outside the resource pool)
Agreements:
  For TX-RX distance-based HARQ feedback for groupcast
    Option 1,
      The location information of TX UE is indicated by the $2^{nd}$ stage SCI payload
        FFS whether/how higher layer signaling is also used in signaling the location information
        FFS whether/how to handle when the location information is not available at TX and/or RX UE.
Some and/or all of the following terminology and assumptions may be used hereafter.
  Base station (BS): A BS is a network central unit and/or a network node in NR and/or LTE which is used to control one or more transmission and reception points (TRPs) which are associated with one or more cells. Communication between BS and one or more TRPs may be via fronthaul. BS may be referred to as central unit (CU), eNB, gNB and/or NodeB.
  New Radio-Physical Downlink Control Channel (NR-PDCCH): A NR-PDCCH carries a downlink control signal which may be used to control communication between a UE and a network side. A network may transmit NR-PDCCH on a configured control resource set (CORESET) to the UE.
  Uplink-control (UL-control) signal: An UL-control signal may be at least one of a scheduling request (SR), channel state information (CSI), Hybrid Automatic Repeat Request acknowledgement (HARQ-ACK), Hybrid Automatic Repeat Request non-acknowledgement (HARQ-NACK), etc. for downlink transmission.
  Slot: A slot is scheduling unit in NR. A duration of a slot (e.g., a slot duration) may be 14 OFDM symbols.
  Downlink common (DL common) signal: A DL common signal is a data channel carrying common information for multiple UEs in a cell and/or all UEs in a cell (e.g., the common information may be targeted to multiple UEs in a cell and/or to all UEs in a cell). Examples of a DL common signal could be at least one of system information, paging, Random Access Response (RAR), etc.
  For network side:
  Radio Resource Control (RRC) layer of network side may be in a BS.
  For UE side:
  There are at least two UE (RRC) states: connected state (also called active state) and non-connected state (also called inactive state and/or idle state). Inactive state may be an additional state and/or may belong to connected state and/or non-connected state.

Use cases in NR sidelink Vehicle-to-Everything (V2X) are increasingly proposed and introduced (e.g., platooning, remote-driving, etc.). In order to serve and/or accommodate for such increasing use cases, NR sidelink V2X supports multiple types of sidelink transmission (such as broadcast sidelink transmission, groupcast sidelink transmission, and/or unicast sidelink transmission) as compared to LTE sidelink V2X which merely supports broadcast sidelink transmission. For groupcast sidelink transmission, there are at least two HARQ-feedback options. A first HARQ-feedback option is that UEs in a group use a resource for transmitting a NACK indication associated with a Transport Block (TB) of a groupcast sidelink transmission (if the TB of a groupcast sidelink transmission is not decoded successfully). A second HARQ-feedback option is that each UE in a group has a resource for transmitting a HARQ-feedback indication (e.g., a HARQ-ACK indication indicating acknowledgment and/or a HARQ-NACK indication indicating non-acknowledgment) associated with a TB of a groupcast sidelink transmission.

It may be supported that a sidelink receiver UE (SL RX UE) in a group is allowed to not transmit a HARQ-feedback indication (e.g., a HARQ-ACK indication and/or a HARQ-NACK indication) if the SL RX UE determines and/or knows that a location of the SL RX UE is outside of a communication range of at least one of a sidelink transmitter UE (SL TX UE) of the group, a service, etc. The communication range may correspond to a minimum required communication range. The SL RX UE may determine location-related information of the SL RX UE (e.g., a location of the SL RX UE) based upon ZONE ID, source ID, and/or geographical information (e.g., moving information). Alternatively and/or additionally, location-related information of the SL TX UE (e.g., a location of the SL TX UE) may be indicated to the SL RX UE via a Sidelink Control Information (SCI).

Alternatively and/or additionally, a supplementary mechanism for determining whether or not a SL RX UE in the group should transmit a HARQ-feedback indication (e.g., a HARQ-ACK indication and/or a HARQ-NACK indication) may be based upon Reference Signal Received Power (RSRP). In some embodiments, the RSRP may be L1-RSRP (Layer 1-RSRP) and/or L3-RSRP (Layer 3-RSRP). In some embodiments, the RSRP may be determined based upon a measurement of a Reference Signal (RS). In some embodiments, the RS may be a Demodulation Reference Signal (DMRS) of a Physical Sidelink Control Channel (PSCCH), a Physical Sidelink Shared Channel (PSSCH) and/or a Channel State Information Reference Signal (CSI-RS). In some embodiments, a HARQ-ACK indication and/or a HARQ-NACK indication is carried and/or delivered via a Physical Sidelink Feedback Channel (PSFCH). A HARQ-feedback indication (e.g., a HARQ-ACK indication and/or a HARQ-NACK indication) may be a type of sidelink feedback control information (SFCI). When a SL RX UE receives a PSCCH and/or PSSCH (e.g., for unicast and/or groupcast), the SL RX UE may report a corresponding sidelink HARQ-feedback indication (e.g., a HARQ-ACK indication and/or a HARQ-NACK indication) via an associated PSFCH. There may be resource association between the PSFCH (comprising the corresponding sidelink HARQ-feedback indication) and at least one of the PSCCH or PSSCH. It is agreed that for a HARQ-feedback indication (e.g., a sidelink HARQ-feedback indication), NR sidelink supports at least a PSFCH format which uses one or more last symbols available for sidelink in a slot. To reduce specification effort and/or complexity, sequence-based PSFCH format (such as NR Physical Uplink Control Channel (PUCCH) format 0/1) may be used (e.g., reused) as PSFCH format structure (e.g., PSFCH format structure is discussed in R1-1905837). It is agreed that sub-channel based resource allocation is supported for PSSCH. In LTE and/or LTE-Advanced (LTE-A), a sub-channel may comprise multiple contiguous Physical Resource Blocks (PRBs) in frequency domain. A higher layer configuration (e.g., at least one of RRC signaling, RRC configuration, etc.) can indicate the number of PRBs of each sub-channel in a corresponding resource pool. Examples of the number of PRBs of a sub-channel are at least one of 4, 5, 6, 8, 9, 10, 12, 15, 16, 18, 20, 25, 30, 48, 50, 72, 75, 96, 100, etc.

It is agreed that NR sidelink V2X support 2-stage SCI (also called two-stage SCI). In other words, SCI (for scheduling a sidelink transmission of a TB) may be separated and/or divided into first-stage SCI (also called 1st SCI) and second-stage SCI (also called 2nd SCI). In some embodiments, a SCI may schedule one or more sidelink transmissions of a TB. In one embodiment, a 1st SCI (e.g., first-stage SCI) may indicate common information (e.g., the common information may comprise at least one of one or more used and/or reserved resources, an indication of priority, a DMRS pattern for PSSCH, etc.). A 2nd SCI (e.g., second-stage SCI) may indicate remaining sidelink control information (e.g., the remaining sidelink control information may comprise at least one of a HARQ-process number, New Data Indication (NDI), location-related information, Redundancy Version (RV), Layer 1 ID (L1 ID), etc.).

In some embodiments, when one or more SL RX UEs receive and/or sense a 1st SCI, the one or more SL RX UEs may determine whether or not an associated resource (e.g., a future associated resource) with a priority is reserved by the 1st SCI (and/or the one or more SL RX UEs may use the 1st SCI to identify one or more associated resources with a priority that are reserved by the 1st SCI). In order to reduce latency, for a 2-stage SCI, a SL RX UE may not need to decode (e.g., blindly decode) a 2nd SCI of the 2-stage SCI. For example, a size of the 2nd SCI and/or an aggregation level for the 2nd SCI may be known to the SL RX UE (and/or the size and/or the aggregation level may be indicated by a 1st SCI of the 2-stage SCI). The 1st SCI may be carried by a PSCCH (similarly to LTE sidelink V2X). The 2nd SCI may be carried by a PSCCH and/or a PSSCH. A resource element for mapping 2nd SCI may be determined based upon a similar mechanism of Uplink Control Information (UCI) multiplexing on PUSCH. A resource mapping order of time-domain and frequency-domain may be designed differently, such as considering latency reduction on SCI decoding.

In some embodiments, for a broadcast sidelink transmission, a SL RX UE may receive only a 1st SCI (of a 2-stage SCI) to receive the broadcast sidelink transmission, such as when there is not a 2nd SCI (of the 2-stage SCI) for scheduling, decoding and/or indicating the broadcast sidelink transmission.

In some embodiments, for a sidelink transmission that is groupcast and/or unicast, a SL RX UE may decode a 1st SCI and a 2nd SCI of a 2-stage SCI to decode and/or receive the sidelink transmission (e.g., groupcast sidelink transmission and/or unicast sidelink transmission). In some embodiments, the 1st SCI and the 2nd SCI of the 2-stage SCI are transmitted in a same slot. Alternatively and/or additionally, sidelink control information and sidelink data transmission are transmitted in a same slot.

In some embodiments, a resource for a PSFCH may be determined (e.g., implicitly determined) based upon a slot index and/or a sub-channel (e.g., resource determination is discussed in Draft Report of 3GPP TSG RAN WG1). The slot index may correspond to a PSCCH slot index and/or the sub-channel may correspond to a starting sub-channel index of the PSCCH, a lowest sub-channel index of the PSCCH and/or a highest sub-channel index of the PSCCH. In some embodiments, when 2-stage SCI is introduced, a resource for a PSFCH may be determined based upon a slot index and/or a sub-channel of a PSCCH carrying a 1st SCI of the 2-stage SCI.

In some embodiments, for groupcast sidelink transmission, a SL RX UE is allowed not to transmit a HARQ-feedback indication (e.g., a HARQ-ACK indication and/or a HARQ-NACK indication) if a location of the SL RX UE is outside of a communication range of at least one of a SL TX UE of a group, a service, etc. However, a SL RX UE in a group may determine and/or know the communication range based upon location-related information indicated in a 2nd SCI of a 2-stage SCI (and/or based upon other information). In an exemplary scenario, the SL RX UE in the group decoded the 1st SCI of the 2-stage SCI successfully and failed to decode the 2nd SCI of the 2-stage SCI. In the exemplary scenario, the SL RX UE may not be able to determine location-related information using the 2nd SCI, and thus the SL RX UE may not know whether or not to transmit a HARQ-feedback indication (e.g., a HARQ-ACK indication and/or a HARQ-NACK indication), such as at least due to the SL RX UE not being able to determine whether or not the location of the SL RX UE is outside of a communication range of at least one of a SL TX UE of the group, a service, etc. A behavior of the SL TX UE and/or the SL RX UE is unspecified for such situations where location-related information is not available to the SL TX UE and/or the SL RX UE. Such situations may occur when Global Navigation Satellite System (GNSS) and/or Global Positioning System (GPS) are not available. It is unspecified how a SL TX UE without available location-related information indicates location-related information associated with the SL TX UE. Further, it is unspecified how a SL RX UE without available location-related information determines whether or not to transmit a HARQ-feedback indication.

Techniques are provided herein, which when implemented, solve the aforementioned issues, such as a SL RX UE determining whether or not to transmit a HARQ-feedback indication and/or a SL TX UE indicating location-related information.

Concept 1

In Concept 1 of the present disclosure, a UE may transmit a NACK indication. A first SL UE may correspond to a transmitter (e.g., a TX UE, such as a SL TX UE). A second SL UE may correspond to a receiver (e.g., a RX UE, such as a SL RX UE). The second SL UE decodes a first SCI in a first slot. In some embodiments, the first SCI indicates information associated with a second SCI and/or a scheduled data. In some embodiments, the second SCI is in the first slot. In some embodiments, the scheduled data is in the first slot. In some embodiments, the first SCI, the second SCI and/or the scheduled data are transmitted by the first SL UE. The second SL UE may determine a first resource for a first PSFCH carrying a feedback indication (e.g., an ACK indication, such as a HARQ-ACK indication, and/or a NACK indication, such as a HARQ-NACK indication) for the scheduled data based upon the first SCI (e.g., the second SL UE may determine the first resource for the first PSFCH based upon the first SCI). In some embodiments, the first resource for the first PSFCH is in a second slot.

In some embodiments, the second SL UE may not successfully decode the second SCI and/or may fail to successfully decode the second SCI. Alternatively and/or additionally, the second SL UE cannot (e.g., is not able to) successfully decode the scheduled data. The second SL UE may generate a NACK indication associated with the scheduled data and/or the second SCI (e.g., the NACK indication may correspond to a HARQ-NACK indication that indicates the scheduled data was not successfully received and/or decoded by the second SL UE). In some embodiments, the second SL UE transmits the first PSFCH (comprising the NACK indication, for example) regardless of whether or not the second SL UE is out of a communication range. In some embodiments, the communication range is associated with a Quality of Service (QoS) and/or a group (e.g., a group for groupcast sidelink transmission). For example, the communication range may be used to achieve the QoS. Alternatively and/or additionally, the communication range may be used by UEs of the group. In some embodiments, if the second SL UE cannot (e.g., is not able to) determine whether or not the second SL UE's location is out of the communication range and/or the second SL UE cannot (e.g., is not able to) determine a distance to the first SL UE, the second SL UE transmits the first PSFCH. In some embodiments, the distance may be determined based upon a location-related information in the second SCI (e.g., the second SL UE may determine the distance based upon the location-related information in the second SCI if the second SL UE receives the second SCI). In some embodiments, the location-related information may be indicative of a first location of the first SL UE. In some embodiments, the second SL UE may determine a second location of the second SL UE. In some embodiments, the second SL UE may determine the distance based upon the location-related information (indicative of the first location of the first SL UE) and the second location of the second SL UE. In some embodiments, the first SL UE and the second SL UE are in a group (e.g., the same group) for groupcast sidelink transmission.

In some embodiments, the second SL UE successfully receives the first SCI and the second SCI. In some embodiments, when the second SL UE determines and/or knows that GNSS and/or GPS are not available in the second SL UE, the second SL UE transmits the first PSFCH (comprising the feedback indication, for example) regardless of whether or not the second SL UE is out of the communication range. In some embodiments, the second SL UE may indicate, to the first SL UE, that the second location of the second SL UE is not available and/or cannot be determined by GNSS and/or GPS. In some embodiments, the second SL UE determines whether or not to transmit the first PSFCH (and/or the feedback indication) based upon whether or not a timer is expired. In some embodiments, the timer may start (and/or restart) when the second SL UE determines a location of the second SL UE based upon GNSS and/or GPS (e.g., the timer may start based upon a time and/or a slot when the second SL UE determines the location of the second SL UE, for example, the timer may start at the time and/or in the slot when the second SL UE determines the location of the second SL UE). Alternatively and/or additionally, the timer may start (and/or restart) when GNSS and/or GPS are available in the second SL UE (e.g., the timer may start based upon a time and/or a slot when GNSS and/or GPS are available in the second SL UE, for example, the timer may start at the time and/or in the slot when GNSS and/or GPS are available in the second SL UE). Alternatively and/or additionally, the timer may start (and/or restart) when the second SL UE is able to determine the location of the second SL UE (e.g., the timer may start based upon a time and/or a slot when the second SL UE is able to determine the location of the second SL UE, for example, the timer may start at the time and/or in the slot when the second SL UE is able to determine the location of the second SL UE). In some embodiments, the timer is running and/or counting when the second SL UE cannot (e.g., is not able to) determine the location of the second SL UE based upon GNSS and/or GPS (such as at a given time and/or in a given slot), such as due to GNSS and/or GPS not being available in the second SL UE. In some embodiments, if the timer is not expired (and/or the timer is running and/or counting), the second SL UE may determine whether or not to transmit the first PSFCH (and/or the feedback indication) based upon a most current location determined based upon GNSS and/or GPS (e.g., the most current location may correspond to a most recently determined location determined based upon GNSS and/or GPS). In some embodiments, the second SL UE may determine and/or estimate the distance between the first SL UE and the second SL UE based upon the most current location and the location-related information indicated in the second SCI. In some embodiments, the second SL UE determines to transmit the first PSFCH (and/or the feedback indication) responsive to a determination that the distance is smaller than the communication range. Alternatively and/or additionally, the second SL UE may determine not to transmit the first PSFCH (and/or the feedback indication) responsive to a determination that the distance is larger than the communication range.

In some embodiments, the first SL UE may perform a retransmission (e.g., a blind retransmission) in a slot before the second slot. In some embodiments, the first SCI is indicative of one or more frequency resources and/or one or more time resources for the scheduled data in the first slot. In some embodiments, the first SCI is indicative of one or more retransmission resources for the scheduled data (e.g., the one or more retransmission resources may correspond to one or more resources for retransmission, such as blind retransmission, of the scheduled data). In some embodiments, the one or more retransmission resources are in one or more slots other than the first slot. In some embodiments, a third SCI is indicative of a fourth SCI and/or the scheduled data in a resource of the one or more retransmission resources (e.g., the third SCI may indicate that the fourth SCI and/or the scheduled data are to be transmitted to the second SL UE in the resource of the one or more retransmission resources). In some embodiments, the resource is in a third slot. In some embodiments, the third slot is different than the first slot and/or the second slot. In some embodiments, the third slot is after the first slot. In some embodiments, the third slot is before the second slot. In some embodiments, one or more resources for PSFCH in the second slot are associated with (e.g., implicitly associated with) SL data (e.g., the scheduled data, the second SCI and/or the fourth SCI) to be received and/or transmitted in the first slot and/or the third slot.

In some embodiments, the second SL UE does not successfully decode and/or fails to successfully decode the fourth SCI. In some embodiments, the second SL UE cannot (e.g., is not able to) successfully decode the second SCI and the fourth SCI. In some embodiments, the second SL UE determines whether or not to generate a NACK indication based upon a decoding result of the scheduled data (e.g., the decoding result may correspond to whether or not the scheduled data is successfully decoded). Alternatively and/or additionally, the second SL UE determines whether or not to generate a NACK indication based upon a combined decoding result of the scheduled data in the first slot and the third slot (e.g., the combined decoding result may correspond to whether or not the scheduled data is successfully decoded using data (of the scheduled data) transmitted in the first slot and/or data (of the scheduled data) transmitted in the third slot). In some embodiments, the second UE generates one or more NACK indications. In some embodiments, each NACK indication of the one or more NACK indications is associated with a transmission and/or a retransmission of the scheduled data (e.g., a first NACK indication of the one or more NACK indications may correspond to an indication that a first transmission of the scheduled data in the first slot is not successfully decoded, and/or a second NACK indication of the one or more NACK indications may correspond to an indication that a retransmission of the scheduled data in the third slot is not successfully decoded). Alternatively and/or additionally, the one or more NACK indications may comprise a single NACK indication that indicates that the scheduled data is not successfully decoded in the first slot and/or the third slot. In some embodiments, the second SL UE may determine a second resource for a second PSFCH in the second slot. In some embodiments, the second PSFCH carries the one or more NACK indications. In some embodiments, the second SL UE determines the second resource based upon the third SCI.

In some embodiments, the first SCI is a 1st SCI (e.g., first-stage SCI) for the scheduled data. In some embodiments, the second SCI is a 2nd SCI (e.g., second-stage SCI) for the scheduled data. The first SCI and the second SCI may correspond to a two-stage SCI for the scheduled data. In some embodiments, the third SCI is a 1st SCI (e.g., first-stage SCI) for retransmission of the scheduled data. In some embodiments, the fourth SCI is a 2nd SCI (e.g., second-stage SCI) for retransmission of the scheduled data. The third SCI and the fourth SCI may correspond to a two-stage SCI for retransmission of the scheduled data.

In some embodiments, if the second SL UE successfully decodes the fourth SCI (and/or if the second SL UE is able to successfully decode the fourth SCI), the second SL UE may determine whether or not to transmit feedback (e.g., a NACK indication, such as a HARQ-NACK indication) based upon information indicated by the fourth SCI. In some embodiments, if the second SL UE successfully decodes the scheduled data transmitted in the third slot (and/or if the second SL UE is able to successfully decode the scheduled data transmitted in the third slot), the second SL UE does not transmit the feedback (e.g., the NACK indication). Alternatively and/or additionally, if the second SL UE successfully decodes the scheduled data based upon a combination of data (of the scheduled data) transmitted in the first slot and data (of the scheduled data) transmitted in the third slot, the second SL UE may not transmit the feedback (e.g., the NACK indication). In some embodiments, if the second SL UE does not successfully decode the scheduled data transmitted in the third slot, the second SL UE transmits the feedback (e.g., the NACK indication).

In some embodiments, the scheduled data is groupcast. In some embodiments, the first SCI indicates a destination ID (e.g., L1-destination ID) that is for a group (such as the group that the first SL UE and the second SL UE are a part of).

In some embodiments, the second SL UE is configured (e.g., pre-configured) to transmit merely NACK indications as feedback to groupcast sidelink transmissions in the group (as opposed to being configured to transmit both NACK indications and ACK indications as feedback to groupcast sidelink transmissions in the group). For example, if the second SL UE does not successfully decode the scheduled data of a groupcast sidelink transmission, the second SL UE generates and/or transmits a NACK indication (e.g., the NACK indication may indicate that the scheduled data is not successfully decoded by the second SL UE). In some embodiments, the second SL UE transmits the NACK indication on a determined PSFCH. Alternatively and/or additionally, if the second SL UE successfully decodes the scheduled data of the groupcast sidelink transmission, the second SL UE may not generate and/or transmit an ACK indication (e.g., the second SL UE may not transmit the ACK indication on a PSFCH). If the second SL UE is not aware of the groupcast sidelink transmission (such as due to Discontinuous Transmission (DTX) and/or due to the second SL UE not decoding the first SCI), the second SL UE may not determine a PSFCH associated with the groupcast sidelink transmission.

Concept 2

In Concept 2 of the present disclosure, a UE may not transmit a NACK indication. A first SL UE may correspond to a transmitter (e.g., a TX UE, such as a SL TX UE). A second SL UE may correspond to a receiver (e.g., a RX UE, such as a SL RX UE). The second SL UE decodes a first SCI in a first slot. In some embodiments, the first SCI indicates information associated with a second SCI and/or a scheduled data. In some embodiments, the second SCI is in the first slot. In some embodiments, the scheduled data is in the first slot. In some embodiments, the first SCI, the second SCI and/or the scheduled data are transmitted by the first SL UE. The second SL UE may determine a first resource for a first PSFCH carrying a feedback indication (e.g., an ACK indication, such as a HARQ-ACK indication, and/or a NACK indication, such as a HARQ-NACK indication) for the scheduled data based upon the first SCI (e.g., the second SL UE may determine the first resource for the first PSFCH based upon the first SCI). In some embodiments, the first resource for the first PSFCH is in a second slot.

In some embodiments, the second SL UE may not successfully decode the second SCI and/or may fail to successfully decode the second SCI. Alternatively and/or additionally, the second SL UE cannot (e.g., is not able to) successfully decode the scheduled data. The second SL UE may generate a NACK indication associated with the scheduled data and/or the second SCI (e.g., the NACK indication may correspond to a HARQ-NACK indication that indicates the scheduled data was not successfully received and/or decoded by the second SL UE). Alternatively and/or additionally, the second SL UE may not generate the NACK indication. In some embodiments, the second SL UE does not transmit the first PSFCH (and/or does not transmit the NACK indication, for example) regardless of whether or not the second SL UE is out of a communication range. In some embodiments, the communication range is associated with a QoS and/or a group (e.g., a group for groupcast sidelink transmission). For example, the communication range may be used to achieve the QoS. Alternatively and/or additionally, the communication range may be used by UEs of the group. In some embodiments, if the second SL UE cannot (e.g., is not able to) determine whether or not the second SL UE's location is out of the communication range and/or the second SL UE cannot (e.g., is not able to) determine a distance to the first SL UE, the second SL UE does not transmit the first PSFCH. In some embodiments, the distance may be determined based upon a location-related information in the second SCI (e.g., the second SL UE may determine the distance based upon the location-related information in the second SCI if the second SL UE receives the second SCI). In some embodiments, the location-related information may be indicative of a first location of the first SL UE. In some embodiments, the second SL UE may determine a second location of the second SL UE. In some embodiments, the second SL UE may determine the distance based upon the location-related information (indicative of the first location of the first SL UE) and the second location of the second SL UE. In some embodiments, the first SL UE and the second SL UE are in a group (e.g., the same group) for groupcast sidelink transmission.

In some embodiments, the first SL UE may perform a retransmission (e.g., a blind retransmission) in a slot before the second slot. In some embodiments, the first SCI is indicative of one or more frequency resources and/or one or more time resources for the scheduled data in the first slot. In some embodiments, the first SCI is indicative of one or more retransmission resources for the scheduled data (e.g., the one or more retransmission resources may correspond to one or more resources for retransmission, such as blind retransmission, of the scheduled data). In some embodiments, the one or more retransmission resources are in one or more slots other than the first slot. In some embodiments, a third SCI is indicative of a fourth SCI and/or the scheduled data in a resource of the one or more retransmission resources (e.g., the third SCI may indicate that the fourth SCI and/or the scheduled data are to be transmitted to the second SL UE in the resource of the one or more retransmission resources). In some embodiments, the resource is in a third slot. In some embodiments, the third slot is different than the first slot and/or the second slot. In some embodiments, the third slot is after the first slot. In some embodiments, the third slot is before the second slot. In some embodiments, one or more resources for PSFCH in the second slot are associated with (e.g., implicitly associated with) SL data (e.g., the scheduled data, the second SCI and/or the fourth SCI) to be received and/or transmitted in the first slot and/or the third slot.

In some embodiments, the second SL UE does not successfully decode and/or fails to successfully decode the fourth SCI. In some embodiments, the second SL UE cannot (e.g., is not able to) successfully decode the second SCI and the fourth SCI. In some embodiments, the second SL UE determines whether or not to generate a NACK indication based upon a decoding result of the scheduled data (e.g., the decoding result may correspond to whether or not the scheduled data is successfully decoded). Alternatively and/or additionally, the second SL UE determines whether or not to generate a NACK indication based upon a combined decoding result of the scheduled data in the first slot and the third slot (e.g., the combined decoding result may correspond to whether or not the scheduled data is successfully decoded using data (of the scheduled data) transmitted in the first slot and/or data (of the scheduled data) transmitted in the third slot). In some embodiments, the second UE generates one or more NACK indications. In some embodiments, each NACK indication of the one or more NACK indications is associated with a transmission and/or a retransmission of the scheduled data (e.g., a first NACK indication of the one or more NACK indications may correspond to an indication that a first transmission of the scheduled data in the first slot is not successfully decoded, and/or a second NACK indication of the one or more NACK indications may correspond to an indication that a retransmission of the scheduled data in the third slot is not successfully decoded). Alternatively and/or additionally, the one or more NACK indications may comprise a single NACK indication that indicates that the scheduled data is not successfully decoded in the first slot and/or the third slot. In some embodiments, the second SL UE may determine a second resource for a second PSFCH in the second slot. In some embodiments, the second PSFCH carries the one or more NACK indications. In some embodiments, the second SL UE determines the second resource based upon the third SCI.

In some embodiments, the first SCI is a 1st SCI (e.g., first-stage SCI) for the scheduled data. In some embodiments, the second SCI is a 2nd SCI (e.g., second-stage SCI) for the scheduled data. The first SCI and the second SCI may correspond to a two-stage SCI for the scheduled data. In some embodiments, the third SCI is a 1st SCI (e.g., first-stage SCI) for retransmission of the scheduled data. In some embodiments, the fourth SCI is a 2nd SCI (e.g., second-stage SCI) for retransmission of the scheduled data. The third SCI and the fourth SCI may correspond to a two-stage SCI for retransmission of the scheduled data.

In some embodiments, if the second SL UE successfully decodes the fourth SCI (and/or if the second SL UE is able to successfully decode the fourth SCI), the second SL UE may determine whether or not to transmit feedback (e.g., a NACK indication, such as a HARQ-NACK indication) based upon information indicated by the fourth SCI. In some embodiments, if the second SL UE successfully decodes the scheduled data transmitted in the third slot (and/or if the second SL UE is able to successfully decode the scheduled data transmitted in the third slot), the second SL UE does not transmit the feedback (e.g., the NACK indication). Alternatively and/or additionally, if the second SL UE successfully decodes the scheduled data based upon a combination of data (of the scheduled data) transmitted in the first slot and data (of the scheduled data) transmitted in the third slot, the second SL UE may not transmit the feedback (e.g., the NACK indication). In some embodiments, if the second SL UE does not successfully decode the scheduled data transmitted in the third slot, the second SL UE transmits the feedback (e.g., the NACK indication).

In some embodiments, the scheduled data is groupcast. In some embodiments, the first SCI indicates a destination ID (e.g., L1-destination ID) that is for a group (such as the group that the first SL UE and the second SL UE are a part of).

In some embodiments, the second SL UE is configured (e.g., pre-configured) to transmit merely NACK indications as feedback to groupcast sidelink transmissions in the group (as opposed to being configured to transmit both NACK indications and ACK indications as feedback to groupcast sidelink transmissions in the group). For example, if the second SL UE does not successfully decode the scheduled data of a groupcast sidelink transmission, the second SL UE generates and/or transmits a NACK indication (e.g., the NACK indication may indicate that the scheduled data is not successfully decoded by the second SL UE). In some embodiments, the second SL UE transmits the NACK indication on a determined PSFCH. Alternatively and/or additionally, if the second SL UE successfully decodes the scheduled data of the groupcast sidelink transmission, the second SL UE may not generate and/or transmit an ACK indication (e.g., the second SL UE may not transmit the ACK indication on a PSFCH). If the second SL UE is not aware of the groupcast sidelink transmission (such as due to DTX and/or due to the second SL UE not decoding the first SCI), the second SL UE may not determine a PSFCH associated with the groupcast sidelink transmission.

Concept 3

In Concept 3 of the present disclosure, a UE determines whether or not to transmit a feedback indication. A first SL UE may correspond to a transmitter (e.g., a TX UE, such as a SL TX UE). A second SL UE may correspond to a receiver (e.g., a RX UE, such as a SL RX UE). The second SL UE decodes a first SCI in a first slot. In some embodiments, the first SCI indicates information associated with a second SCI and/or a scheduled data. In some embodiments, the second SCI is in the first slot. In some embodiments, the scheduled data is in the first slot. In some embodiments, the first SCI, the second SCI and/or the scheduled data are transmitted by the first SL UE. The second SL UE may determine a first resource for a first PSFCH carrying a feedback indication (e.g., an ACK indication, such as a HARQ-ACK indication, and/or a NACK indication, such as a HARQ-NACK indication) for the scheduled data based upon the first SCI (e.g., the second SL UE may determine the first resource for the first PSFCH based upon the first SCI). In some embodiments, the first resource for the first PSFCH is in a second slot.

In some embodiments, the second SL UE may not successfully decode the second SCI and/or may fail to successfully decode the second SCI. Alternatively and/or additionally, the second SL UE cannot (e.g., is not able to) successfully decode the scheduled data. The second SL UE may generate a NACK indication associated with the scheduled data and/or the second SCI (e.g., the NACK indication may correspond to a HARQ-NACK indication that indicates the scheduled data was not successfully received and/or decoded by the second SL UE). In some embodiments, a location-related information (such as comprised in the second SCI) may be indicative of a first location of the first SL UE. In some embodiments, the second SL UE may determine a second location of the second SL UE. In some embodiments, the second SL UE may determine a distance (e.g., a distance between the first SL UE and the second SL UE) based upon the location-related information (indicative of the first location of the first SL UE) and the second location of the second SL UE. In some embodiments, the first SL UE and the second SL UE are in a group (e.g., the same group) for groupcast sidelink transmission.

In some embodiments, the second SL UE may determine whether or not to transmit the NACK indication based upon a power measurement. In some embodiments, if the power measurement is above a power threshold, the second SL UE determines to transmit the NACK indication. In some embodiments, if the power measurement is below a power threshold, the second SL UE determines not to transmit the NACK indication. In some embodiments, a power threshold may be associated with an indication of priority, QoS-related information and/or channel busy ratio (CBR). In some embodiments, the second SL UE may be configured (e.g., pre-configured) with an association between one or more power thresholds and at least one of one or more indications of priority or QoS-related information. In some embodiments, the second SL UE may determine the power threshold based upon the indication of priority (and/or the QoS-related information and/or the CBR). In some embodiments, the indication of priority is indicated by the first SCI. In some embodiments, the power measurement is a RSRP measurement and/or the power threshold is a RSRP threshold. Alternatively and/or additionally, the power measurement may be a Reference Signal Received Quality (RSRQ) measurement and/or the power threshold may be a RSRQ threshold. Alternatively and/or additionally, the power measurement may be a Received Signal Strength Indication (RSSI) measurement and/or the power threshold may be a RSSI threshold. In some embodiments, the power measurement is performed based upon a measurement on DMRS of a PSCCH (and/or the power measurement may correspond to a measurement of the DMRS), wherein the PSCCH delivers the first SCI. Alternatively and/or additionally, the power measurement may be performed based upon a measurement on DMRS of a PSSCH indicated by the first SCI (and/or the power measurement may correspond to a measurement of the DMRS), wherein the PSSCH delivers the scheduled data.

In some embodiments, the second SL UE may determine whether or not to transmit the NACK indication based upon an indication of priority. In some embodiments, the indication of priority is indicated by the first SCI.

In some embodiments, if the indication of priority (and/or a priority indicated by the indication of priority) is above a priority threshold, the second SL UE determines to transmit the NACK indication. In some embodiments, if the indication of priority (and/or the priority indicated by the indication of priority) is below the priority threshold, the second SL UE determines not to transmit the NACK indication.

Alternatively and/or additionally, if the indication of priority (and/or the priority indicated by the indication of priority) is below a priority threshold, the second SL UE determines to transmit the NACK indication. In some embodiments, if the indication of priority (and/or the priority indicated by the indication of priority) is above the priority threshold, the second SL UE determines not to transmit the NACK indication.

In some embodiments, the second SL UE may determine whether or not to transmit the NACK indication based upon location-related information indicated by a most recent groupcast sidelink transmission. In some embodiments, the most recent groupcast sidelink transmission is transmitted by a third SL UE. In some embodiments, the first SL UE, the second SL UE and the third SL UE are in the same group for groupcast sidelink transmission. In some embodiments, the third SL UE is a leader UE in the group. In some embodiments, the third SL UE has a lowest identity amongst a plurality of identities of a plurality of UEs in the group. Alternatively and/or additionally, the third SL UE has a highest identity amongst the plurality of identities of the plurality of UEs in the group. Alternatively and/or additionally, the third SL UE has a specific identity in the group. In some embodiments, the second SL UE may determine a distance to a UE (e.g., the first SL UE) that transmits the first SCI based upon the location-related information indicated by the third SL UE. In some embodiments, the second SL UE determines whether or not to apply the location-related information for the most recent groupcast sidelink transmission based upon a timer and/or a counter. In some embodiments, if the timer and/or the counter are not expired, the second SL UE may apply the location-related information indicated by the most recent groupcast sidelink transmission to determine whether or not to transmit the NACK indication. Application of the location-related information to determine whether or not to transmit the NACK indication may comprise determining the distance to the first SL UE based upon the location-related information and/or determining whether or not to transmit the NACK indication based upon the distance. In an example, the second SL UE may determine to transmit the NACK indication if the distance is smaller than a threshold distance (e.g., a communication range). Alternatively and/or additionally, the second SL UE may determine not to transmit the NACK indication if the distance is larger than the threshold distance (e.g., the communication range). In some embodiments, if the timer and/or the counter are expired, the second SL UE may determine whether or not to transmit the NACK indication using one or more of the techniques presented herein, such as one or more of the techniques described with respect to Concept 1, one or more of the techniques described with respect to Concept 2, and/or one or more other techniques presented herein (e.g., the second SL UE may determine whether or not to transmit the NACK indication based upon information other than the location-related information, such as at least one of the power measurement, the indication of priority, etc.).

In some embodiments, the first SCI is indicative of one or more frequency resources and/or one or more time resources for the scheduled data in the first slot. In some embodiments, the first SCI is indicative of one or more retransmission resources for the scheduled data (e.g., the one or more retransmission resources may correspond to one or more resources for retransmission, such as blind retransmission, of the scheduled data). In some embodiments, the one or more retransmission resources are in one or more slots other than the first slot. In some embodiments, a third SCI is indicative of a fourth SCI and/or the scheduled data in a resource of the one or more retransmission resources (e.g., the third SCI may indicate that the fourth SCI and/or the scheduled data are to be transmitted to the second SL UE in the resource of the one or more retransmission resources). In some embodiments, the resource is in a third slot. In some embodiments, the third slot is different than the first slot and/or the second slot. In some embodiments, the third slot is after the first slot. In some embodiments, the third slot is before the second slot. In some embodiments, one or more resources for PSFCH in the second slot are associated with (e.g., implicitly associated with) SL data (e.g., the scheduled data, the second SCI and/or the fourth SCI) to be received and/or transmitted in the first slot and/or the third slot.

In some embodiments, the second SL UE does not successfully decode and/or fails to successfully decode the fourth SCI. In some embodiments, the second SL UE cannot (e.g., is not able to) successfully decode the second SCI and the fourth SCI. In some embodiments, the second SL UE determines whether or not to generate a NACK indication based upon a decoding result of the scheduled data (e.g., the decoding result may correspond to whether or not the scheduled data is successfully decoded). Alternatively and/or additionally, the second SL UE determines whether or not to generate a NACK indication based upon a combined decoding result of the scheduled data in the first slot and the third slot (e.g., the combined decoding result may correspond to whether or not the scheduled data is successfully decoded using data (of the scheduled data) transmitted in the first slot and/or data (of the scheduled data) transmitted in the third slot). In some embodiments, the second UE generates one or more NACK indications. In some embodiments, each NACK indication of the one or more NACK indications is associated with a transmission and/or a retransmission of the scheduled data (e.g., a first NACK indication of the one or more NACK indications may correspond to an indication that a first transmission of the scheduled data in the first slot is not successfully decoded, and/or a second NACK indication of the one or more NACK indications may correspond to an indication that a retransmission of the scheduled data in the third slot is not successfully decoded). Alternatively and/or additionally, the one or more NACK indications may comprise a single NACK indication that indicates that the scheduled data is not successfully decoded in the first slot and/or the third slot. In some embodiments, the second SL UE may determine a second resource for a second PSFCH in the second slot. In some embodiments, the second PSFCH carries the one or more NACK indications. In some embodiments, the second SL UE determines the second resource based upon the third SCI.

In some embodiments, the first SCI is a 1st SCI (e.g., first-stage SCI) for the scheduled data. In some embodiments, the second SCI is a 2nd SCI (e.g., second-stage SCI) for the scheduled data. The first SCI and the second SCI may correspond to a two-stage SCI for the scheduled data. In some embodiments, the third SCI is a 1st SCI (e.g., first-stage SCI) for retransmission of the scheduled data. In some embodiments, the fourth SCI is a 2nd SCI (e.g., second-stage SCI) for retransmission of the scheduled data. The third SCI and the fourth SCI may correspond to a two-stage SCI for retransmission of the scheduled data.

In some embodiments, if the second SL UE successfully decodes the fourth SCI (and/or if the second SL UE is able to successfully decode the fourth SCI), the second SL UE may determine whether or not to transmit feedback (e.g., a NACK indication, such as a HARQ-NACK indication) based upon information indicated by the fourth SCI. In some embodiments, if the second SL UE successfully decodes the scheduled data transmitted in the third slot (and/or if the second SL UE is able to successfully decode the scheduled data transmitted in the third slot), the second SL UE does not transmit the feedback (e.g., the NACK indication). Alternatively and/or additionally, if the second SL UE successfully decodes the scheduled data based upon a combination of data (of the scheduled data) transmitted in the first slot and data (of the scheduled data) transmitted in the third slot, the second SL UE may not transmit the feedback (e.g., the NACK indication). In some embodiments, if the second SL UE does not successfully decode the scheduled data transmitted in the third slot, the second SL UE transmits the feedback (e.g., the NACK indication).

In some embodiments, the scheduled data is groupcast. In some embodiments, the first SCI indicates a destination ID (e.g., L1-destination ID) that is for a group (such as the group that the first SL UE and the second SL UE are a part of).

In some embodiments, the second SL UE is configured (e.g., pre-configured) to transmit merely NACK indications as feedback to groupcast sidelink transmissions in the group (as opposed to being configured to transmit both NACK indications and ACK indications as feedback to groupcast sidelink transmissions in the group). For example, if the second SL UE does not successfully decode the scheduled data of a groupcast sidelink transmission, the second SL UE generates and/or transmits a NACK indication (e.g., the NACK indication may indicate that the scheduled data is not successfully decoded by the second SL UE). In some embodiments, the second SL UE transmits the NACK indication on a determined PSFCH. Alternatively and/or additionally, if the second SL UE successfully decodes the scheduled data of the groupcast sidelink transmission, the second SL UE may not generate and/or transmit an ACK indication (e.g., the second SL UE may not transmit the ACK indication on a PSFCH). If the second SL UE is not aware of the groupcast sidelink transmission (such as due to DTX and/or due to the second SL UE not decoding the first SCI), the second SL UE may not determine a PSFCH associated with the groupcast sidelink transmission.

Concept 4

In Concept 4 of the present disclosure, DTX may be defined as a 1st SCI loss. For a 2-stage SCI scheduling a sidelink transmission (e.g., a groupcast sidelink transmission and/or a unicast sidelink transmission) with feedback (e.g., HARQ-ACK feedback and/or HARQ-NACK feedback), sidelink control information for scheduling a PSSCH may be delivered via a 1st SCI (e.g., first-stage SCI) and a 2nd SCI (e.g., second-stage SCI).

In some embodiments, "DTX" state corresponds to a state when a SL RX UE does not successfully decode the 1st SCI. "NACK" state may correspond to a state when a SL RX UE cannot successfully decode the PSSCH (and/or the SL RX UE successfully decodes the 1st SCI and/or the 2nd SCI). Alternatively and/or additionally, "NACK" state may correspond to a state when a SL RX UE cannot successfully decode the 2nd SCI (and/or the SL RX UE successfully decodes the 1st SCI).

In some embodiments, "DTX" state corresponds to a state when a SL RX UE does not successfully decode the 1st SCI. Alternatively and/or additionally, "DTX" state may correspond to a state when a SL RX UE successfully decodes the 1st SCI and does not successfully decode the 2nd SCI. "NACK" state may correspond to a state when the SL RX UE cannot successfully decode the PSSCH, and the SL RX UE successfully decodes the 1st SCI and/or the 2nd SCI.

In some embodiments, the SL RX UE may transmit a NACK indication when the SL RX UE is in "NACK" state.

Concept 5

In Concept 5 of the present disclosure, a granularity for one or more zones and/or one or more locations may be dynamically indicated (such as when a location of a TX UE is not available to the TX UE). A first SL UE is in a group for performing groupcast sidelink transmission. In a first slot (and/or at a first time), the first SL UE may determine location-related information of the first SL UE (such as indicative of a first location of the first SL UE). For example, the location-related information may be determined if GNSS and/or GPS (and/or a positioning mechanism) are available in the first SL UE. The first SL UE may indicate the first location and/or a first granularity (for the first location). In an example, the first SL UE indicates the first location and/or the first granularity (for the first location) by transmitting a SCI (e.g., a 2nd SCI and/or second-stage SCI) indicative of the first location and/or the first granularity. In a second slot (and/or at a second time), the first SL UE cannot determine location-related information of the first SL UE (e.g., the first SL UE may not be able to determine a second location of the first SL UE at the second time and/or in the second slot). For example, the first SL UE may not be able to determine the second location due to GNSS and/or GPS (and/or a positioning mechanism) being unavailable in the first SL UE. The first SL UE may indicate the first location and/or a second granularity (e.g., the second granularity may be for the first location). In an example, the first SL UE indicates the first location and/or the second granularity (for the first location) by transmitting a SCI indicative of the first location and/or the second granularity. Alternatively and/or additionally, the first SL UE may estimate the second location (of the first SL UE at the second time and/or in the second slot) based upon the first location and/or the second granularity. In some embodiments, the first SL UE estimates the second location based upon the first location and/or at least one of a speed, velocity, direction, etc. (e.g., at least one of the speed, velocity, direction, etc. of the first SL UE may be detected by the first SL UE). The first SL UE may indicate the second location and/or the second granularity (e.g., the second granularity may be for the second location). In an example, the first SL UE indicates the second location and/or the second granularity (for the second location) by transmitting a SCI indicative of the second location and/or the second granularity. In some embodiments, the first slot (and/or the first time) is before the second slot (and/or the second time). In some embodiments, the first location may correspond to a most recently determined location (e.g., a most recently determined location that is determined using GNSS, GPS and/or a positioning mechanism). Alternatively and/or additionally, the first slot (and/or the first time) may correspond to a most recent slot (and/or a most recent time) that the first SL UE is able to determine location-related information and/or a location of the first SL UE (e.g., a most recent slot and/or a most recent time that the first SL UE is able to determine the location-related information and/or the location of the first SL UE using GNSS, GPS and/or a positioning mechanism). In some embodiments, the second granularity is larger than or equal to the first granularity.

In some embodiments, the first SL UE indicates location-related information of the first SL UE via a SCI (e.g., a 2nd SCI and/or second-stage SCI), such as by transmitting the SCI (e.g., the SCI may comprise the location-related information). In some embodiments, the first SL UE may indicate the location-related information at or after the second time (and/or in or after the second slot). In some embodiments, the location-related information may be associated with the first SL UE at the second time (and/or in the second slot). In some embodiments, the location-related information may comprise granularity information (such as indicative of the second granularity) and a location indication. In some embodiments, the location indication may comprise at least one of a ZONE ID, a source ID, geographical information (e.g., moving information), etc. associated with the first location and/or the second location (e.g., estimated location of the first SL UE at the second time and/or in the second slot). In some embodiments, if a time duration between the first slot and the second slot is larger, the granularity information may indicate a larger and/or more rough granularity (e.g., the second granularity may be a function of the time duration and/or one or more other parameters, where the second granularity may be larger and/or more rough with an increase of the time duration). In some embodiments, the granularity information and the location indication may be indicated in a single SCI field (e.g., the granularity information and the location indication may be indicated in the same SCI field of the SCI) or in separate SCI fields (e.g., the granularity information may be indicated in a first SCI field of the SCI and the location indication may be indicated in a second SCI field of the SCI that is separate from the first SCI field). In some embodiments, the second granularity (indicated by the granularity information) may correspond to a level of granularity for the location indication of the location-related information (e.g., the location indication is indicative of the first location of the first SL UE in the first slot or the second location (e.g., the estimated location) of the first SL UE in the second slot). In some embodiments, 2 bits (or a different number of bits) in a SCI may indicate the level of granularity for the location indication. In some embodiments, an indication of priority may be configured (e.g., pre-configured) with one or more levels of granularity. In some embodiments, the level of granularity for the location indication may be based upon an indication of priority associated with the SCI (e.g., the indication of priority may indicate a priority and/or an importance of the SCI, data of the SCI and/or data scheduled by the SCI). In some embodiments, if an importance of the SCI, data of the SCI, and/or data scheduled by the SCI is greater (and/or a priority indicated by the indication of priority is greater), the granularity information may indicate a smaller and/or less rough granularity (e.g., a more precise and/or more accurate granularity and/or location).

A second SL UE is in a group, such as in the same group that the first SL UE is in. The second SL UE receives a groupcast sidelink transmission from the first SL UE. The second SL UE may determine a distance between the first SL UE and the second SL UE based upon the location-related information (such as received by the second SL UE via the SCI). In some embodiments, the second SL UE may determine to transmit a feedback indication (e.g., an ACK indication, such as a HARQ-ACK indication, and/or a NACK indication, such as a HARQ-NACK indication) in response to the groupcast sidelink transmission based upon reception of the location indication (such as indicative of the first location or the second location) and/or the granularity information (such as indicative of the second granularity). Alternatively and/or additionally, the second SL UE may determine to transmit feedback, associated with the groupcast sidelink transmission, the first SL UE, and/or the first group, more conservatively based upon reception of the location indication (such as indicative of the first location or the second location) and/or the granularity information (such as indicative of the second granularity). Alternatively and/or additionally, the second SL UE may determine to transmit an increased amount of feedback associated with the groupcast sidelink transmission, the first SL UE, and/or the first group based upon reception of the location indication (such as indicative of the first location or the second location) and/or the granularity information (such as indicative of the second granularity). In some embodiments, whether or not to transmit a feedback indication in response to the groupcast sidelink transmission may be determined based upon the distance (such as by comparing the distance with a threshold and/or by using one or more other techniques presented herein).

FIG. 5 is a diagram 500 illustrating an exemplary scenario associated with a first SL UE 506 and/or a second SL UE 512, according to some embodiments. The first SL UE 506 may correspond to a transmitter (e.g., a SL TX UE) and/or the second SL UE 512 may correspond to a receiver (e.g., a SL RX UE). The first SL UE 506 and/or the second SL UE 512 are in a group for groupcast sidelink transmission. In a first timing (e.g., at a first time, in a first slot, and/or in a first time period other than the first slot), the first SL UE 506 may determine a location (e.g., a geographical location) of the first SL UE 506, such as location (5,4), with a first granularity. The location (5,4) may comprise an exemplary x-coordinate, 5, and/or an exemplary y-coordinate, 4. In some embodiments, the first SL UE 506 indicates the location (5,4) with the first granularity. For example, the first SL UE 506 may indicate the location (5,4) with the first granularity by transmitting, such as in the first timing and/or after the first timing, an indication (e.g., a SCI) indicative of the location (5,4), the first granularity and/or a first zone 504. The indication may be transmitted to one or more other UEs in the group, such as the second SL UE 512. The first zone 504 may correspond to an area determined based upon the location (5,4) and/or the first granularity (e.g., the first zone 504 may be determined by the first SL UE 506 and/or the one or more UEs).

In a second timing (e.g., at a second time, in a second slot and/or in a second time period other than the second slot), the first SL UE 506 may not be able to determine and/or fails to determine a location (e.g., a geographical location) of the first SL UE 506. In some embodiments, the first SL UE 506 indicates the location (5,4) with a second granularity. For example, the first SL UE 506 may indicate the location (5,4) with the second granularity by transmitting, such as in the second timing and/or after the second timing, an indication (e.g., a SCI) indicative of the location (5,4), the second granularity and/or a second zone 508. The indication may be transmitted to one or more other UEs in the group, such as the second SL UE 512. The second zone 508 may correspond to an area determined based upon the location (5,4) and/or the second granularity (e.g., the second zone 508 may be determined by the first SL UE 506 and/or the one or more UEs). In an example, the second granularity may be 9 times the first granularity. Accordingly, in the diagram 500, the first zone 504 is shown as one square, and the second zone 508 is shown as nine squares.

The second SL UE 512 may receive, such as from the first SL UE 506, an indication associated with the first timing that is indicative of the location (5,4), the first granularity and/or the first zone 504. In an example, the second SL UE 512 may be able to determine, such as in the first timing and/or after the first timing, a location (e.g., a geographical location) of the second SL UE 512, such as location (1,1). Accordingly, the second SL UE 512 may determine a first distance to the first SL UE 506 (e.g., a distance between the first SL UE 506 and the second SL UE 512 in the first timing) based upon the location (5,4) indicated by the first SL UE 506 and the location (1,1) of the second SL UE 512.

The second SL UE 512 may receive, such as from the first SL UE 506, an indication associated with the second timing that is indicative of the location (5,4), the second granularity and/or the second zone 508. In an example, the second SL UE 512 may be able to determine, such as in the second timing and/or after the second timing, a location (e.g., a geographical location) of the second SL UE 512, such as location (1,1). Accordingly, the second SL UE 512 may determine a second distance to the first SL UE 506 (e.g., a distance between the first SL UE 506 and the second SL UE 512 in the second timing) based upon a location (4,3) of the second zone 508 and the location (1,1) of the second SL UE 512. For example, the second distance may be determined based upon the location (4,3) based upon a determination that the location (4,3) is a nearest location, of the second zone 508, to the second SL UE 512. In some embodiments, the second SL UE 512 may determine whether or not to transmit a feedback indication (e.g., an ACK indication, such as a HARQ-ACK indication, and/or a NACK indication, such as a HARQ-NACK indication) based upon the second distance, such as using one or more of the techniques presented herein.

Figure 6:
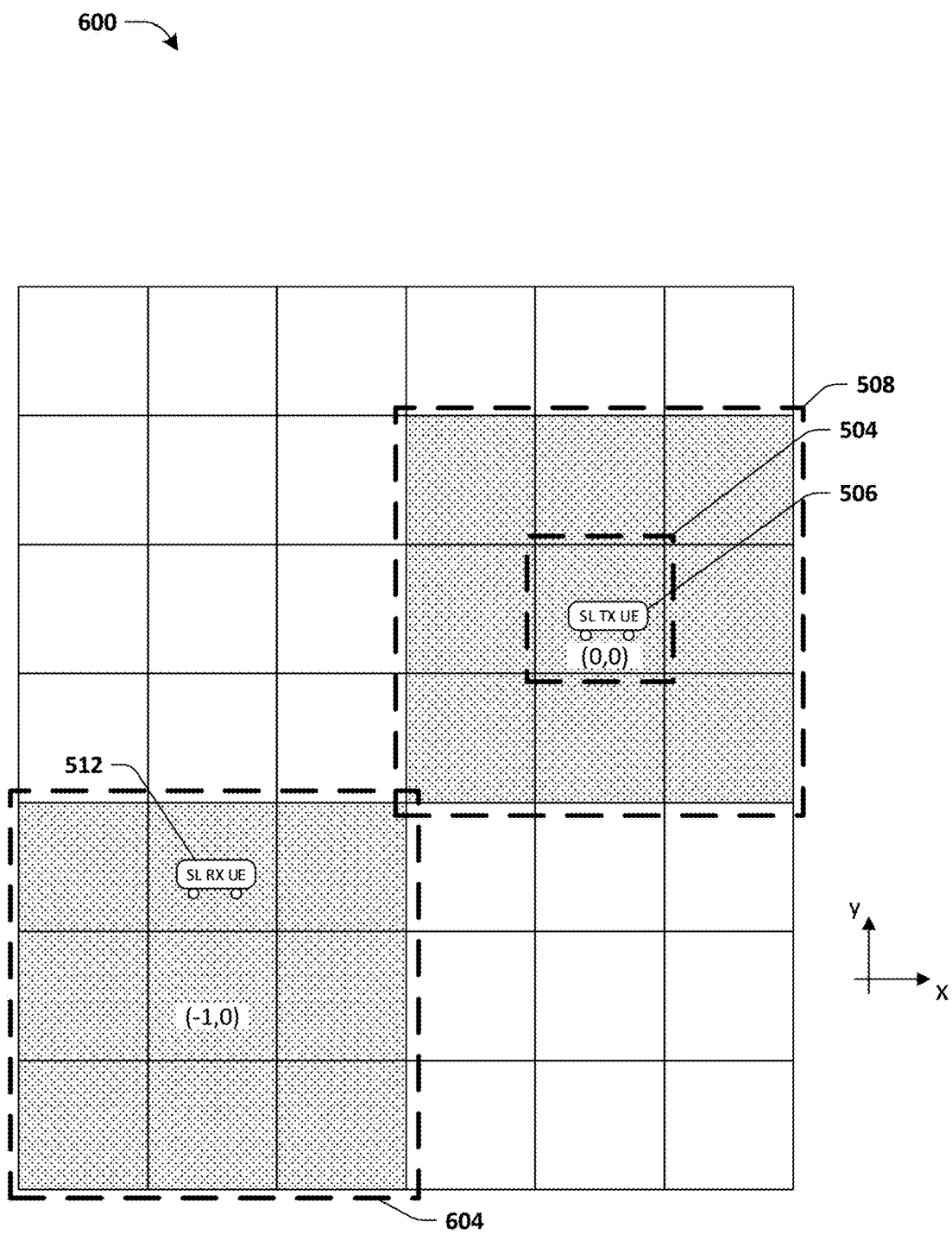
FIG. 6 is a diagram illustrating an exemplary scenario associated with a first UE and/or a second UE according to one exemplary embodiment.

FIG. 6 is a diagram 600 illustrating an exemplary scenario associated with the first SL UE 506 and/or the second SL UE 512, according to some embodiments. In the exemplary scenario of FIG. 6, the second SL UE 512 may determine, such as in the second timing and/or after the second timing, a location (e.g., a geographical location) of the second SL UE 512, such as location (−1,0). The location (−1,0) may be determined based upon the second granularity. For example, the location (−1,0) may correspond to a location of a third zone 604 associated with the second granularity. The second distance may be determined based upon the location (−1,0) and/or a location (0,0) of the first SL UE 512. The location (0,0) may correspond to a location of the second zone 508. The location (−1,0) and/or the second distance may be determined based upon the second granularity responsive to receiving an indication of the second granularity from the first SL UE 506.

Example Embodiment 1

In example embodiment 1 of the present disclosure, a second UE may perform groupcast sidelink communication in a group.

The second UE may be configured (e.g., pre-configured) to determine whether or not to transmit a feedback indication (e.g., an ACK indication, such as a HARQ-ACK indication, and/or a NACK indication, such as a HARQ-NACK indication), associated with a groupcast sidelink transmission transmitted by a first UE, based upon whether or not a distance between the second UE and the first UE is larger than a threshold.

In some embodiments, the groupcast sidelink transmission is scheduled by a first SCI and/or a second SCI in a first slot. The first SCI and the second SCI are transmitted (in the first slot) by the first UE.

In some embodiments, the second SCI is indicative of a location-related information.

In some embodiments, the second UE receives the first SCI scheduling the groupcast sidelink transmission.

In some embodiments, the second UE determines a PSFCH resource based upon the first SCI.

In some embodiments, if the second UE cannot determine the distance (e.g., the second UE is not able to determine the distance between the second UE and the first UE) and/or the second UE does not and/or fails to decode the second SCI, the second UE transmits a NACK indication on the PSFCH resource. For example, the second UE may transmit the NACK indication on the PSFCH resource regardless of whether or not the distance is larger than the threshold.

In some embodiments, if the second UE cannot determine the distance and/or the second UE does not and/or fails to decode the second SCI, the second UE does not transmit a NACK indication on the PSFCH resource. For example, the second UE may not transmit the NACK indication on the PSFCH resource regardless of whether or not the distance is larger than the threshold.

In some embodiments, if the second UE successfully decodes the second SCI, the second UE may determine the distance (and/or the second UE may be able to determine the distance).

In some embodiments, the second UE performs a sidelink transmission in a sidelink resource pool.

In some embodiments, the sidelink resource pool is in a carrier and/or a cell.

In some embodiments, the second UE determines the PSFCH resource based upon a slot index of a slot in which the second UE receives a PSCCH carrying the first SCI.

In some embodiments, the second UE determines the PSFCH resource based upon a starting sub-channel index of a PSCCH carrying the first SCI. Alternatively and/or additionally, the second UE may determine the PSFCH resource based upon a lowest sub-channel index of the PSCCH carrying the first SCI. Alternatively and/or additionally, the second UE may determine the PSFCH resource based upon a highest sub-channel index of the PSCCH carrying the first SCI.

In some embodiments, the first UE and the second UE are in the group for performing groupcast sidelink transmission and/or groupcast sidelink communication.

In some embodiments, the first SCI is indicative of a destination identity associated with the group (e.g., the destination identity may belong to the group).

In some embodiments, the PSFCH resource is in a second slot.

In some embodiments, the second slot is different than the first slot and the second slot is after the first slot.

In some embodiments, the second slot and the first slot are slots associated with the resource pool (e.g., the second slot and the first slot may belong to the resource pool).

In some embodiments, one or more UEs in the group are configured (e.g., pre-configured) to perform NACK-based feedback. For example, the one or more UEs in the group may be configured (e.g., pre-configured) to merely perform NACK-based feedback. For example, the one or more UEs in the group may be configured (e.g., pre-configured) to transmit merely NACK indications as feedback to groupcast sidelink transmissions in the group (as opposed to being configured to transmit both NACK indications and ACK indications as feedback to groupcast sidelink transmissions in the group). In some embodiments, the one or more UEs in the group comprise one, some and/or all UEs of the group.

In some embodiments, for the group, the second UE transmits, determines and/or generates a NACK indication when the second UE does not decode the groupcast sidelink transmission successfully.

In some embodiments, for the group, the second UE does not transmit a feedback indication (e.g., a HARQ feedback indication, such as a HARQ-NACK indication) when the second UE cannot decode and/or fails to decode the first SCI, and/or when the second UE successfully decodes the groupcast sidelink transmission.

In some embodiments, for the group, the second UE does not generate a feedback indication (e.g., a HARQ feedback indication, such as a HARQ-NACK indication) for transmission when the second UE cannot decode and/or fails to decode the first SCI, and/or when the second UE successfully decodes the groupcast sidelink transmission.

In some embodiments, the first SCI is a 1st SCI (e.g., first-stage SCI).

In some embodiments, the second SCI is a 2nd SCI (e.g., second-stage SCI).

In some embodiments, the location-related information is associated with a location of the first UE (e.g., the location-related information is the first UE's location-related information).

In some embodiments, the NACK indication is associated with a decoding result of the groupcast sidelink transmission (e.g., the NACK indication may be transmitted, determined and/or generated based upon the decoding result and/or the decoding result may correspond to whether or not the groupcast sidelink transmission is successfully decoded).

In some embodiments, the second UE needs to decode the first SCI and the second SCI for decoding the groupcast sidelink transmission (e.g., the second UE may not be able to decode the groupcast sidelink transmission without decoding the first SCI and the second SCI).

In some embodiments, the location-related information comprises at least one of a ZONE ID, a source ID, geographical information (e.g., moving information), etc.

In some embodiments, the second UE determines the distance based upon the location-related information.

In some embodiments, the groupcast sidelink transmission is a PSSCH or is carried by a PSSCH.

In some embodiments, if the second UE cannot determine the distance based upon the second SCI and/or the second UE does not (and/or fails to) decode the second SCI, the second UE determines whether or not to transmit a NACK indication based upon a rule.

In some embodiments, the rule is if a RSRP measurement of a RS transmitted by the second UE is above a RSRP threshold, the second UE transmits the NACK indication. For example, if the second UE cannot determine the distance based upon the second SCI and/or the second UE does not (and/or fails to) decode the second SCI, the second UE may determine to transmit the NACK indication based upon a determination that the RSRP measurement is above the RSRP threshold.

In some embodiments, the rule may be if the RSRP measurement of the RS transmitted by the second UE is below the RSRP threshold, the second UE transmits the NACK indication. For example, if the second UE cannot determine the distance based upon the second SCI and/or the second UE does not (and/or fails to) decode the second SCI, the second UE may determine to transmit the NACK indication based upon a determination that the RSRP measurement is below the RSRP threshold.

In some embodiments, the RS is associated with the groupcast sidelink transmission and/or the first SCI.

In some embodiments, the RS is a DMRS of a PSSCH or a PSCCH carrying the first SCI.

In some embodiments, the rule is if a priority associated with the first SCI and/or the groupcast sidelink transmission is above a priority threshold, the second UE transmits the NACK indication. The priority may correspond to an indication of priority indicated by the first SCI. For example, if the second UE cannot determine the distance based upon the second SCI and/or the second UE does not (and/or fails to) decode the second SCI, the second UE may determine to transmit the NACK indication based upon a determination that the priority is above the priority threshold.

In some embodiments, the rule is if the priority associated with the first SCI and/or the groupcast sidelink transmission is below the priority threshold, the second UE transmits the NACK indication. For example, if the second UE cannot determine the distance based upon the second SCI and/or the second UE does not (and/or fails to) decode the second SCI, the second UE may determine to transmit the NACK indication based upon a determination that the priority is below the priority threshold.

In some embodiments, the second UE is configured (e.g., pre-configured) to determine whether or not to transmit a feedback indication (e.g., an ACK indication, such as a HARQ-ACK indication, and/or a NACK indication, such as a HARQ-NACK indication) associated with a groupcast sidelink transmission from a first UE based upon whether or not a distance between the second UE and the first UE is larger than a threshold. In some embodiments, if the distance between the second UE and the first UE is smaller than the threshold, the second UE is required to transmit a feedback indication (such as only if the feedback indication is a NACK indication) associated with the groupcast sidelink transmission. In some embodiments, if the distance between the second UE and the first UE is larger than the threshold, the second UE is not required to transmit a feedback indication associated with the groupcast sidelink transmission.

In some embodiments, if the second UE successfully decodes the second SCI, the second UE may determine the distance (and/or the second UE may be able to determine the distance).

Example Embodiment 2

A first UE performs groupcast sidelink communication in a group.

The first UE is configured (e.g., pre-configured) with a set of granularities comprising a first granularity and a second granularity and/or one or more other granularities.

The first granularity and/or the second granularity may be used for interpreting and/or processing the location of the first UE.

The first UE transmits, at a first time and/or in a first slot, a SCI scheduling a groupcast sidelink transmission.

The SCI comprises a location-related information and a granularity of the set of granularities.

The SCI is a 2nd SCI (e.g., a second-stage SCI).

In some embodiments, the location-related information is indicative of a location (e.g., a geographical location) of the first UE and/or information related to the location of the first UE.

In some embodiments, if the first UE is able to successfully determine and/or successfully determines a location of the first UE with the first granularity, the first UE indicates the location-related information with the first granularity (e.g., the first UE may indicate the location-related information with the first granularity by transmitting the SCI comprising the location-related information indicative of the location and/or the first granularity).

In some embodiments, if the first UE cannot successfully determine a location of the first UE with the first granularity, the first UE indicates the location-related information with the second granularity.

In some embodiments, the first granularity is a default granularity for interpreting location-related information.

In some embodiments, the first granularity is a finest and/or smallest granularity of the set of granularities.

In some embodiments, the first granularity is finer and/or smaller than the second granularity.

In some embodiments, the first UE determines a first location (e.g., a geographical location) of the first UE with the first granularity. The first location may be determined in the first slot or before the first slot (and/or at the first time or before the first time).

In some embodiments, at the first time and/or in the first slot, the first UE indicates the first location with the first granularity (e.g., the first UE may indicate the first location with the first granularity by transmitting an indication of the first location and/or the first granularity).

In some embodiments, in a second slot or before the second slot (and/or at a second time or before the second time), the first UE cannot determine a location (e.g., a geographical location) of the first UE with the first granularity.

In some embodiments, in the second slot and/or at the second time, the first UE indicates the first location with the second granularity or an estimated location with the second granularity.

In some embodiments, the first slot is a most recent slot that the first UE determines (and/or is able to determine) a location of the first UE with the first granularity.

In some embodiments, the first time is a most recent time that the first UE determines (and/or is able to determine) a location of the first UE with the first granularity.

In some embodiments, in the second slot and/or at the second time, the first UE indicates a second location based upon the first location (e.g., the first UE may indicate the second location by transmitting an indication of the second location and/or the first granularity).

In some embodiments, in the second slot and/or at the second time, the first UE indicates the second granularity (in association with the second location, for example).

In some embodiments, the second location is the same as the first location.

In some embodiments, the second location is different than the first location.

In some embodiments, the second location is an estimated location of the first UE (e.g., the second location may be estimated based upon the first location and/or at least one of a speed, velocity, direction, etc. of the first UE).

In some embodiments, the set of granularities is for the group.

In some embodiments, the first UE determines a time interval between the first slot and the second slot (and/or between the first time and the second time).

In some embodiments, the first UE determines to use a granularity of the set of granularities based upon the time interval (e.g., the granularity, such as the second granularity, may be selected from the set of granularities based upon the time interval). The first UE may indicate the second location with the second granularity in the second slot and/or at the second time responsive to selecting the second granularity from the set of granularities based upon the time interval.

In some embodiments, the second granularity is the same as the first granularity.

In some embodiments, the second granularity is larger and/or more rough than the first granularity.

In some embodiments, if the time interval is larger (e.g., the first UE cannot determine its geographical location for a longer duration of time), the second granularity (that is selected, determined and/or indicated by the first UE) is larger and/or more rough (and/or the second granularity exceeds the first granularity by more).

In some embodiments, if the time interval is smaller (e.g., the first UE cannot determine its geographical location for a shorter duration of time), the second granularity (that is selected, determined and/or indicated by the first UE) is shorter and/or less rough (and/or the second granularity exceeds the first granularity by less).

In some embodiments, an amount by which the second granularity (that is selected, determined and/or indicated by the first UE) is larger and/or more rough than the first granularity is a function of the time interval and/or one or more other parameters, where the amount increases with an increase of the time interval.

In some embodiments, the set of granularities comprises a third granularity indicating infinity and/or infinite granularity.

In some embodiments, the second slot and/or the second time are after the first slot and/or the first time.

In some embodiments, the first UE is configured (e.g., pre-configured) with a communication range for the group or a service.

In some embodiments, a second UE in the group determines a distance between the first UE and the second UE based upon the location-related information and the granularity (e.g., the second granularity) in the SCI.

In some embodiments, if the distance determined by the second UE is larger than the communication range, the second UE does not transmit a HARQ-ACK/NACK indication associated with the groupcast sidelink transmission.

In some embodiments, if the SCI indicates a specific location-related information and/or a specific granularity (and/or a field of the SCI corresponding to granularity indicates a specific value), the second UE transmits a HARQ-ACK/NACK indication regardless of whether or not the distance is larger than the communication range. In some embodiments, if the SCI indicates specific location-related information and/or a specific granularity (and/or a field of the SCI corresponding to granularity indicates a specific value), the second UE assumes the distance is not larger than the communication range or assumes the distance is smaller than the communication range (and/or assumes that the second UE is within the communication range (from the first UE)).

In some embodiments, the specific granularity or the specific value corresponds to the third granularity (e.g., infinity and/or infinite granularity). In some embodiments, when the first UE cannot determine the location-related information associated with the first UE (such as due to GNSS, GPS, and/or a positioning mechanism being unavailable), the first UE may indicate the third granularity in the SCI (e.g., the third granularity may be included in the SCI).

In some embodiments, the specific location-related information (included in the SCI, for example) may indicate that location-related information of the first UE is unavailable (and/or that there is no location-related information of the first UE). In some embodiments, the specific location-related information may indicate that the first UE cannot determine location-related information associated with the first UE (such as due to GNSS, GPS, and/or a positioning mechanism being unavailable). In some embodiments, when the first UE cannot determine location-related information associated with the first UE (such as due to GNSS, GPS, and/or a positioning mechanism being unavailable), the first UE may indicate the specific location-related information in the SCI.

One, some and/or all of the foregoing techniques and/or embodiments can be formed to a new embodiment.

In some embodiments, embodiments disclosed herein, such as embodiments described with respect to Concept 1, Concept 2, Concept 3, Concept 4, Concept 5, example embodiment 1 and example embodiment 2, may be implemented independently and/or separately. Alternatively and/or additionally, a combination of embodiments described herein, such as embodiments described with respect to Concept 1, Concept 2, Concept 3, Concept 4, Concept 5, example embodiment 1 and/or example embodiment 2, may be implemented. Alternatively and/or additionally, a combination of embodiments described herein, such as embodiments described with respect to Concept 1, Concept 2, Concept 3, Concept 4, Concept 5, example embodiment 1 and/or example embodiment 2, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

In some embodiments, such as embodiments described with respect to Concept 1, Concept 2, Concept 3, Concept 4, Concept 5, example embodiment 1 and/or example embodiment 2 and/or others described herein, a SL UE determines a location (e.g., a geographical location) of the SL UE based upon (and/or using) GNSS and/or GPS (and/or a positioning mechanism). In some embodiments, such as embodiments described with respect to Concept 1, Concept 2, Concept 3, Concept 4, Concept 5, example embodiment 1 and/or example embodiment 2 and/or others described herein, a SL UE indicates a location (e.g., a geographical location) of the SL UE via a ZONE ID field (e.g., a ZONE ID field of a SCI) and/or a L1-source ID field (e.g., a L1-source ID field of the SCI). For example, a location indication, indicative of the location, may be included in the ZONE ID field and/or the L1-source ID field of the SCI.

In some embodiments, such as embodiments described with respect to Concept 1, Concept 2, Concept 3, Concept 4, Concept 5, example embodiment 1 and/or example embodiment 2 and/or others described herein, the sidelink transmission and/or the sidelink reception may be device-to-device transmission and/or device-to-device reception. Alternatively and/or additionally, the sidelink transmission and/or the sidelink reception may be V2X transmission and/or V2X reception. Alternatively and/or additionally, the sidelink transmission and/or the sidelink reception may be P2X transmission and/or P2X reception. In some embodiments, such as embodiments described with respect to Concept 1, Concept 2, Concept 3, Concept 4, Concept 5, example embodiment 1 and/or example embodiment 2 and/or others described herein, the sidelink transmission and/or the sidelink reception may be performed on PC5 interface.

In some embodiments, the PC5 interface may be a wireless interface for communication between a device and a device (e.g., two separate devices). In some embodiments, the PC5 interface may be a wireless interface for communication between devices. In some embodiments, the PC5 interface may be a wireless interface for communication between UEs. In some embodiments, the PC5 interface may be a wireless interface for V2X communication and/or P2X communication. In some embodiments, the Uu interface may be a wireless interface for communication between a network node and a device. In some embodiments, the Uu interface may be a wireless interface for communication between a network node and a UE.

In some embodiments, such as embodiments described with respect to Concept 1, Concept 2, Concept 3, Concept 4, Concept 5, example embodiment 1 and/or example embodiment 2 and/or others described herein, a slot may be represented as a transmission time interval (TTI). In some embodiments, such as embodiments described with respect to Concept 1, Concept 2, Concept 3, Concept 4, Concept 5, example embodiment 1 and/or example embodiment 2 and/or others described herein, a slot may mean a sidelink slot and/or a slot for sidelink. In some embodiments, such as embodiments described with respect to Concept 1, Concept 2, Concept 3, Concept 4, Concept 5, example embodiment 1 and/or example embodiment 2 and/or others described herein, a TTI may be a subframe (for sidelink). In some embodiments, such as embodiments described with respect to Concept 1, Concept 2, Concept 3, Concept 4, Concept 5, example embodiment 1 and/or example embodiment 2 and/or others described herein, a TTI comprises multiple symbols (e.g., 12 or 14 symbols). In some embodiments, such as embodiments described with respect to Concept 1, Concept 2, Concept 3, Concept 4, Concept 5, example embodiment 1 and/or example embodiment 2 and/or others described herein, a TTI may be a slot comprising sidelink symbols (e.g., the slot may fully comprise sidelink symbols or partially comprise sidelink symbols). In some embodiments, such as embodiments described with respect to Concept 1, Concept 2, Concept 3, Concept 4, Concept 5, example embodiment 1 and/or example embodiment 2 and/or others described herein, a TTI may correspond to a TTI for a sidelink transmission and/or sidelink reception (e.g., transmission and/or reception of sidelink data). In some embodiments, such as embodiments described with respect to Concept 1, Concept 2, Concept 3, Concept 4, Concept 5, example embodiment 1 and/or example embodiment 2 and/or others described herein, a TTI may correspond to a sidelink minimum resource allocation unit.

Figure 7:
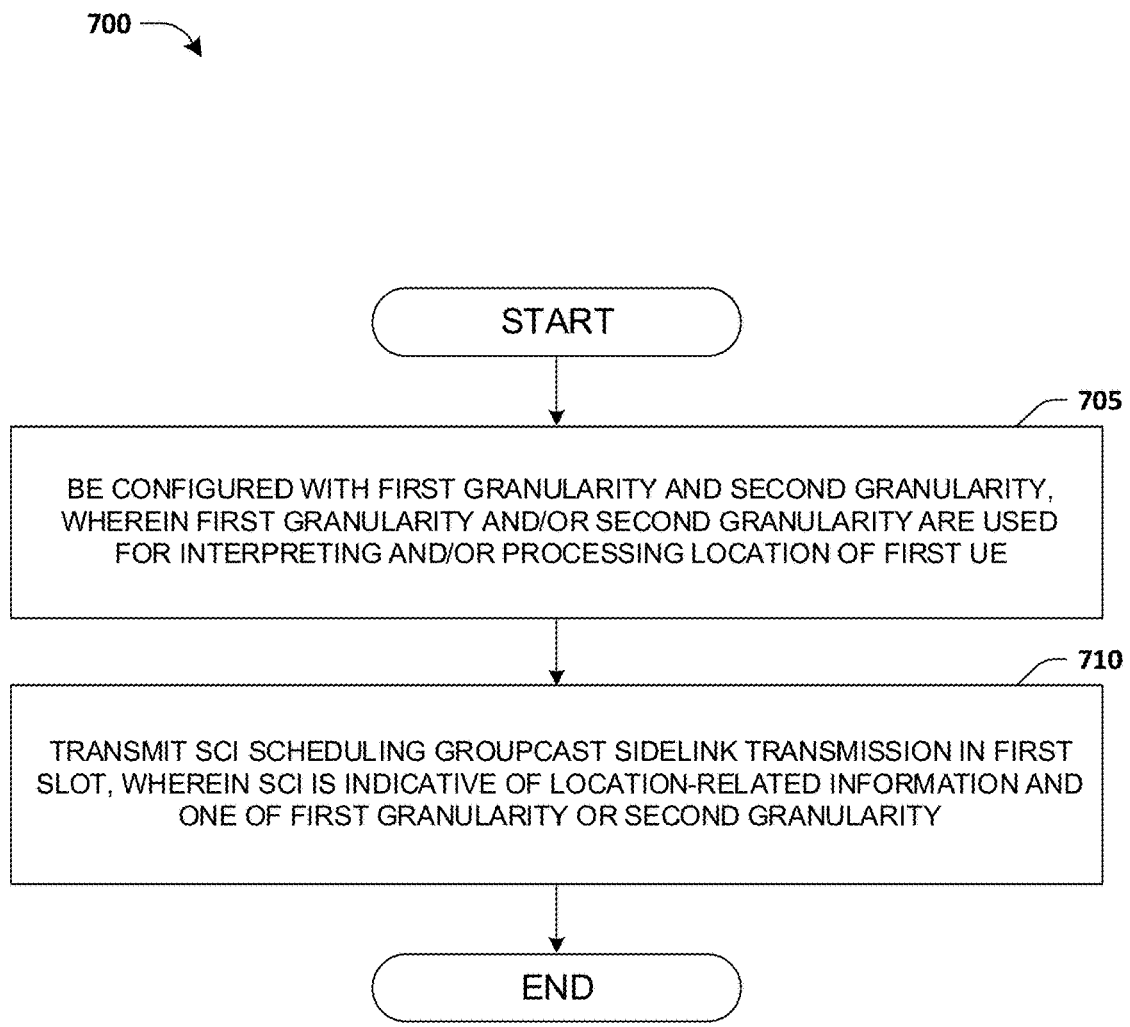
FIG. 7 is a flow chart according to one exemplary embodiment.

FIG. 7 is a flow chart 700 according to one exemplary embodiment from the perspective of a first UE. The flow chart 700 illustrates a method to perform groupcast sidelink communication in a group. In step 705, the first UE is configured (e.g., pre-configured) with a first granularity and a second granularity, wherein the first granularity and/or the second granularity are used for interpreting and/or processing a location of the first UE. In step 710, the first UE transmits a SCI scheduling a groupcast sidelink transmission in a first slot (and/or in a first timing), wherein the SCI is indicative of a location-related information and one of the first granularity or the second granularity.

In one embodiment, the location-related information is indicative of a location (e.g., a geographical location) of the first UE.

In one embodiment, if the first UE is able to successfully determine (and/or derive) and/or successfully determines (and/or derives) a location of the first UE with the first granularity, the first UE indicates the location-related information with the first granularity (e.g., the first UE may indicate the location-related information with the first granularity by transmitting the SCI comprising the location-related information indicative of the location and/or the first granularity).

In one embodiment, if the first UE cannot successfully determine (and/or derive) a location of the first UE with the first granularity, the first UE indicates the location-related information with the second granularity.

In one embodiment, the first granularity is a default granularity for interpreting location-related information.

In one embodiment, the first granularity is a finest and/or smallest granularity of the set of granularities.

In one embodiment, the first granularity is finer and/or smaller than the second granularity.

In one embodiment, the first UE determines (and/or derives) a first location (e.g., a geographical location) of the first UE with the first granularity. The first location may be determined (and/or derived) in the first slot or before the first slot (and/or in the first timing or before the first timing).

In one embodiment, in the first slot (and/or in the first timing), the first UE indicates the first location with the first granularity (e.g., the first UE may indicate the first location with the first granularity by transmitting an indication of the first location and/or the first granularity).

In one embodiment, in a second slot or before the second slot (and/or in a second timing or before the second timing), the first UE cannot determine (and/or derive) a location (e.g., a geographical location) of the first UE with the first granularity.

In one embodiment, in the second slot (and/or in the second timing), the first UE indicates the first location with the second granularity.

In one embodiment, the first slot is a most recent slot that the first UE determines (and/or derives and/or is able to determine and/or derive) a location of the first UE with the first granularity.

In one embodiment, the first timing is a most recent timing that the first UE determines (and/or derives and/or is able to determine and/or derive) a location of the first UE with the first granularity.

In one embodiment, in the second slot (and/or in the second timing), the first UE indicates a second location based upon the first location (e.g., the first UE may indicate the second location by transmitting an indication of the second location and/or the first granularity).

In one embodiment, in the second slot (and/or in the second timing), the first UE indicates the second granularity (in association with the second location, for example).

In one embodiment, the second location is the same as the first location.

In one embodiment, the second location is different than the first location.

In one embodiment, the second location is an estimated location of the first UE (e.g., the second location may be estimated based upon the first location and/or at least one of a speed, velocity, direction, etc. of the first UE).

In one embodiment, the first UE is configured (e.g., pre-configured) with a set of granularities comprising the first granularity and the second granularity.

In one embodiment, the set of granularities is for the group.

In one embodiment, first UE determines (and/or derives) a time interval between the first slot and the second slot (and/or between the first timing and the second timing).

In one embodiment, the first UE determines to use a granularity of the set of granularities based upon the time interval (e.g., the granularity, such as the second granularity, may be selected from the set of granularities based upon the time interval). The first UE may indicate the second location with the second granularity in the second slot (and/or in the second timing) responsive to selecting the second granularity from the set of granularities based upon the time interval.

In one embodiment, the second granularity is the same as the first granularity.

In one embodiment, the second granularity is larger and/or more rough than the first granularity.

In one embodiment, if the time interval is larger (e.g., the first UE cannot determine (and/or derive) its geographical location for a longer duration of time), the second granularity (that is selected, determined and/or indicated by the first UE) is larger and/or more rough (and/or the second granularity exceeds the first granularity by more).

In one embodiment, if the time interval is smaller (e.g., the first UE cannot determine (and/or derive) its geographical location for a shorter duration of time), the second granularity (that is selected, determined and/or indicated by the first UE) is shorter and/or less rough (and/or the second granularity exceeds the first granularity by less).

In one embodiment, an amount by which the second granularity (that is selected, determined and/or indicated by the first UE) is larger and/or more rough than the first granularity is a function of the time interval and/or one or more other parameters, where the amount increases with an increase of the time interval.

In one embodiment, the set of granularities comprises a third granularity indicating infinity and/or infinite granularity.

In one embodiment, the second slot (and/or the second timing) is after the first slot (and/or the first timing).

In one embodiment, the first UE is configured (e.g., pre-configured) with a communication range for the group or a service.

In one embodiment, a second UE in the group determines (and/or derives) a distance between the first UE and the second UE based upon the location-related information and the granularity (e.g., the second granularity) in the SCI.

In one embodiment, if the distance determined (and/or derived) by the second UE is larger than the communication range, the second UE does not transmit a HARQ-ACK/NACK indication associated with the groupcast sidelink transmission.

In one embodiment, if the SCI indicates a specific granularity (and/or a field of the SCI corresponding to granularity indicates a specific value), the second UE transmits a HARQ-ACK/NACK indication regardless of whether or not the distance is larger than the communication range.

In one embodiment, the specific granularity or the specific value corresponds to the third granularity (e.g., infinity and/or infinite granularity).

Referring back to FIGS. 3 and 4, in one exemplary embodiment of a first UE, the device 300 includes a program code 312 stored in the memory 310. The CPU 308 could execute program code 312 to enable the first UE (i) to be configured (e.g., pre-configured) with a first granularity and a second granularity, wherein the first granularity and/or the second granularity are used for interpreting and/or processing a location of the first UE, and (ii) to transmit a SCI scheduling a groupcast sidelink transmission in a first slot (and/or in a first timing), wherein the SCI is indicative of a location-related information and one of the first granularity or the second granularity. Furthermore, the CPU 308 can execute the program code 312 to perform one, some and/or all of the above-described actions and steps and/or others described herein.

Figure 8:
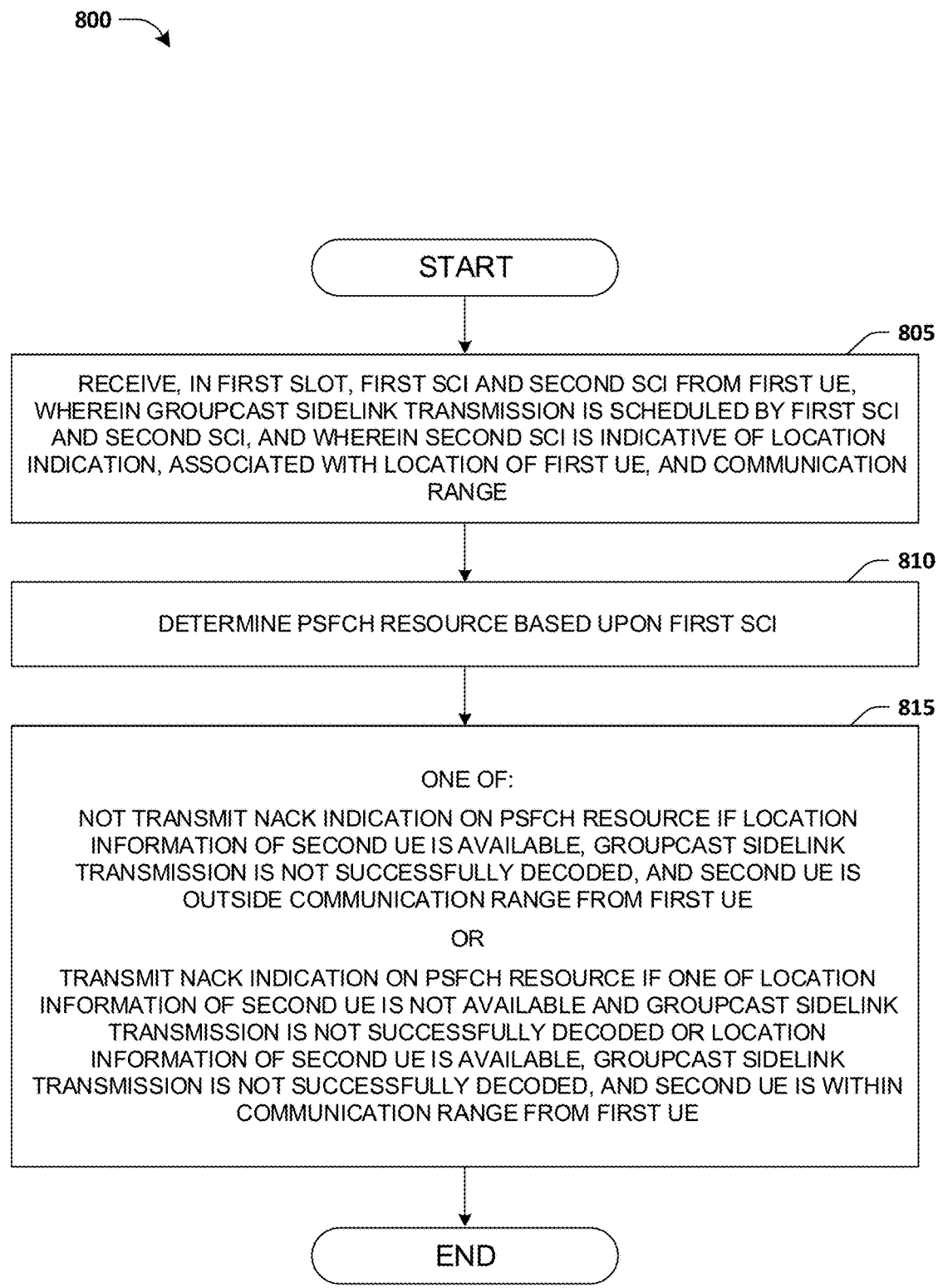
FIG. 8 is a flow chart according to one exemplary embodiment.

FIG. 8 is a flow chart 800 according to one exemplary embodiment from the perspective of a second UE. The flow chart 800 illustrates a method to perform HARQ feedback in response to a group sidelink transmission for a group. In step 805, the second UE receives, in a first slot, a first SCI and a second SCI from a first UE. The groupcast sidelink transmission is scheduled by the first SCI and the second SCI. The second SCI is indicative of a location indication, associated with a location of the first UE, and a communication range (e.g., the location indication may indicate a location of the first UE, a zone in which the first UE is located and/or a level of granularity associated with the location of the first UE). In step 810, the second UE determines (and/or derives) a PSFCH resource based upon the first SCI (and/or based upon other information). In step 815, the second UE transmits, or does not transmit, a NACK indication on the PSFCH resource. The second UE does not transmit the NACK indication on the PSFCH resource if a location information (e.g., a geographical location information) of the second UE is available, the groupcast sidelink transmission is not successfully decoded, and the second UE is outside the communication range from the first UE. The second UE transmits the NACK indication on the PSFCH resource if the location information of the second UE is not available and the groupcast sidelink transmission is not successfully decoded, or if the location information of the second UE is available, the groupcast sidelink transmission is not successfully decoded, and the second UE is within the communication range from the first UE.

For example, the second UE may not transmit the NACK indication on the PSFCH resource based upon a determination that the location information of the second UE is available, the groupcast sidelink transmission is not successfully decoded, and the second UE is outside the communication range from the first UE.

Alternatively and/or additionally, the second UE may transmit the NACK indication on the PSFCH resource based upon a determination that the location information of the second UE is not available and the groupcast sidelink transmission is not successfully decoded.

Alternatively and/or additionally, the second UE may transmit the NACK indication on the PSFCH resource based upon a determination that the location information of the second UE is available, the groupcast sidelink transmission is not successfully decoded, and the second UE is within the communication range from the first UE.

In one embodiment, the second UE is outside the communication range from the first UE. In an example, the communication range may be associated with a threshold distance. The second UE may be outside the communication range from the first UE if a distance between the second UE and the first UE is larger than the threshold distance. Alternatively and/or additionally, the second UE may be within the communication range from the first UE if a distance between the second UE and the first UE is smaller than the threshold distance. In an example, a distance between the second UE and the first UE may be determined based upon the location information of the second UE (if the location information is available, for example) and the location indication associated with the location of the first UE.

In one embodiment, the first UE and the second UE are in the group.

In one embodiment, the first SCI is a 1st SCI (e.g., first-stage SCI) and the second SCI is a 2nd SCI (e.g., second-stage SCI). For example, the first SCI and the second SCI may correspond to a two-stage SCI.

In one embodiment, the NACK indication is associated with a decoding result of the groupcast sidelink transmission.

In one embodiment, the location indication comprises a ZONE ID of the first UE. The second UE determines (and/or derives) the location of the first UE based upon the ZONE ID (e.g., the ZONE ID may correspond to an indication and/or identification of a location of the first UE and/or a zone in which the first UE is located).

In one embodiment, the second UE determines (and/or derives and/or acquires) the location information of the second UE using (and/or based upon) GNSS, GPS and/or a positioning mechanism. For example, the second UE may derive the location information from data received from a device associated with GNSS, GPS, and/or a positioning mechanism. Alternatively and/or additionally, the second UE may acquire the location information from a device associated with GNSS, GPS, and/or a positioning mechanism.

In one embodiment, the second UE transmits the NACK indication on the PSFCH resource if the location information of the second UE is not available, the groupcast sidelink transmission is not successfully decoded and one of the second UE is outside the communication range from the first UE or the second UE is within the communication range from the first UE. For example, the second UE may transmit the NACK indication on the PSFCH resource based upon a determination that the location information of the second UE is not available, the groupcast sidelink transmission is not successfully decoded and one of the second UE is outside the communication range from the first UE or the second UE is within the communication range from the first UE.

In one embodiment, the second UE transmits (e.g., always transmits) a NACK indication on the PSFCH resource if the location information of the second UE is not available, the groupcast sidelink transmission is not successfully decoded and the second UE is outside the communication range from the first UE. For example, the second UE may transmit (e.g., always transmits) a NACK indication on the PSFCH resource based upon a determination that the location information of the second UE is not available, the groupcast sidelink transmission is not successfully decoded and the second UE is outside the communication range from the first UE.

In one embodiment, the second UE transmits (e.g., always transmits) a NACK indication on the PSFCH resource if the location information of the second UE is not available, the groupcast sidelink transmission is not successfully decoded and the second UE is within the communication range from the first UE. For example, the second UE may transmit (e.g., always transmits) a NACK indication on the PSFCH resource based upon a determination that the location information of the second UE is not available, the groupcast sidelink transmission is not successfully decoded and the second UE is within the communication range from the first UE.

In one embodiment, the second UE transmits (e.g., always transmits) a NACK indication on the PSFCH resource if the location information of the second UE is not available and the groupcast sidelink transmission is not successfully decoded. For example, the second UE may transmit (e.g., always transmits) a NACK indication on the PSFCH resource based upon a determination that the location information of the second UE is not available and the groupcast sidelink transmission is not successfully decoded.

In one embodiment, the second UE transmits a NACK indication on the PSFCH resource if the location information of the second UE is not available and the groupcast sidelink transmission is not successfully decoded, regardless of other parameters and/or characteristics associated with the first UE, the second UE and/or the group. For example, the second UE may transmit a NACK indication on the PSFCH resource based upon a determination that the location information of the second UE is not available and the groupcast sidelink transmission is not successfully decoded, regardless of other parameters and/or characteristics associated with the first UE, the second UE and/or the group.

In one embodiment, the second UE transmits the NACK indication on the PSFCH resource, regardless of whether or not the second UE is within the communication range from the first UE, if the location information of the second UE is not available and the groupcast sidelink transmission is not successfully decoded. For example, the second UE may transmit the NACK indication on the PSFCH resource based upon a determination that the location information of the second UE is not available and the groupcast sidelink transmission is not successfully decoded, regardless of whether or not the second UE is within the communication range from the first UE.

In one embodiment, the location information of the second UE is available (and/or considered to be available) when the second UE is able to determine (and/or derive and/or acquire) the location information via at least one of GNSS, GPS, or a positioning mechanism (e.g., the second UE considers the location information to be available if the second UE is able to determine (and/or derive and/or acquire) the location information via at least one of a GNSS, GPS, or a positioning mechanism). For example, the location information of the second UE is available (and/or considered to be available) when the second UE is able to derive the location information from data received from a device associated with GNSS, GPS, and/or a positioning mechanism. Alternatively and/or additionally, the location information of the second UE is available (and/or considered to be available) when the second UE is able to acquire the location information from a device associated with GNSS, GPS, and/or a positioning mechanism.

Referring back to FIGS. 3 and 4, in one exemplary embodiment of a second UE, the device 300 includes a program code 312 stored in the memory 310. The CPU 308 could execute program code 312 to enable the second UE (i) to receive, in a first slot, a first SCI and a second SCI from a first UE, wherein the groupcast sidelink transmission is scheduled by the first SCI and the second SCI, and wherein the second SCI is indicative of a location indication, associated with a location of the first UE, and a communication range, (ii) to determine (and/or derive) a PSFCH resource based upon the first SCI (and/or based upon other information), and one of (iii) to not transmit a NACK indication on the PSFCH resource if a location information (e.g., a geographical location information) of the second UE is available, the groupcast sidelink transmission is not successfully decoded, and the second UE is outside the communication range from the first UE, or (iv) to transmit the NACK indication on the PSFCH resource if the location information of the second UE is not available and the groupcast sidelink transmission is not successfully decoded, or if the location information of the second UE is available, the groupcast sidelink transmission is not successfully decoded, and the second UE is within the communication range from the first UE. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 7-8. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 7-8, and/or one, some and/or all of the above-described actions and steps and/or others described herein.

It may be appreciated that applying one or more of the techniques presented herein may result in one or more benefits including, but not limited to, increased efficiency of communication between devices (e.g., UEs) (e.g., as a result of enabling a device to more quickly and/or accurately determine whether or not to transmit feedback associated with a sidelink transmission).

Various aspects of the disclosure have been described above. It should be apparent that the teachings herein may be embodied in a wide variety of forms and that any specific structure, function, or both being disclosed herein is merely representative. Based upon the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based upon pulse repetition frequencies. In some aspects concurrent channels may be established based upon pulse position or offsets. In some aspects concurrent channels may be established based upon time hopping sequences. In some aspects concurrent channels may be established based upon pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a second User Equipment (UE) for performing Hybrid Automatic Repeat Request (HARQ) feedback in response to one or more groupcast sidelink transmissions for a group, the method comprising:
    receiving, in a first slot, a first first-stage sidelink control information (SCI) and a first second-stage SCI from a first UE, wherein:
        a first groupcast sidelink transmission is scheduled by the first first-stage SCI and the first second-stage SCI; and
        the first second-stage SCI is indicative of a first location indication, associated with a first location of the first UE, a first communication range, and first granularity information for at least one of interpreting or processing the first location of the first UE, wherein the first location indication comprises a ZONE ID of the first UE;
    determining a first Physical Sidelink Feedback Channel (PSFCH) resource based upon the first first-stage SCI;
    if a first location information of the second UE is available to the second UE, determining, by the second UE, whether to transmit a non-acknowledgement (NACK) indication on the first PSFCH resource based upon a combination of:
        whether the first groupcast sidelink transmission is not successfully decoded; and
        whether the second UE is within the first communication range from the first UE;
    not transmitting the NACK indication on the first PSFCH resource responsive to determining that the first location information of the second UE is available to the second UE, the first groupcast sidelink transmission is not successfully decoded, and the second UE is outside the first communication range from the first UE;
    receiving, in a second slot, a second first-stage SCI and a second second-stage SCI from the first UE, wherein:
        a second groupcast sidelink transmission is scheduled by the second first-stage SCI and the second second-stage SCI; and
        the second second-stage SCI is indicative of a second location indication, associated with a second location of the first UE, a second communication range, and second granularity information for at least one of interpreting or processing the second location of the first UE, wherein the second location indication comprises a ZONE ID of the first UE;
    determining a second PSFCH resource based upon the second first-stage SCI;
    if a second location information of the second UE is not available to the second UE, determining, by the second UE, whether to transmit a second NACK indication on the second PSFCH resource based upon whether the second groupcast sidelink transmission is not successfully decoded;
    transmitting the second NACK indication on the second PSFCH resource responsive to determining that the second location information of the second UE is not available to the second UE and the second groupcast sidelink transmission is not successfully decoded;
    receiving, in a third slot, a third first-stage SCI and a third second-stage SCI from the first UE, wherein:
        a third groupcast sidelink transmission is scheduled by the third first-stage SCI and the third second-stage SCI; and
        the third second-stage SCI is indicative of a third location indication, associated with a third location of the first UE, a third communication range, and third granularity information for at least one of interpreting or processing the third location of the first UE, wherein the third location indication comprises a ZONE ID of the first UE;
    determining a third PSFCH resource based upon the third first-stage SCI;
    if a third location information of the second UE is available to the second UE, determining, by the second UE, whether to transmit a third NACK indication on the third PSFCH resource based upon a combination of:
        whether the third groupcast sidelink transmission is not successfully decoded; and
        whether the second UE is within the third communication range from the first UE; and
    transmitting the third NACK indication on the third PSFCH resource responsive to determining that the third location information of the second UE is available to the second UE, the third groupcast sidelink transmission is not successfully decoded, and the second UE is within the third communication range from the first UE.

2. The method of claim 1, wherein:
the first UE and the second UE are in the group.

3. The method of claim 1, at least one of:
wherein the NACK indication is associated with a decoding result of the first groupcast sidelink transmission;
wherein the second NACK indication is associated with a decoding result of the second groupcast sidelink transmission; and
wherein the third NACK indication is associated with a decoding result of the third groupcast sidelink transmission.

4. The method of claim 1, comprising at least one of:
determining the first location of the first UE based upon the ZONE ID indicated by the first second-stage SCI;
determining the second location of the first UE based upon the ZONE ID indicated by the second second-stage SCI; or
determining the third location of the first UE based upon the ZONE ID indicated by the third second-stage SCI.

5. The method of claim 1, comprising:
determining at least one of the first location information of the second UE or the third location information of the second UE using at least one of a Global Navigation Satellite System (GNSS), a Global Positioning System (GPS), or a positioning mechanism.

6. The method of claim 1, wherein at least one of:
the first location information of the second UE is available to the second UE when the second UE is able to determine the first location information via at least one of a Global Navigation Satellite System (GNSS), a Global Positioning System (GPS), or a positioning mechanism; or
the third location information of the second UE is available to the second UE when the second UE is able to determine the third location information via at least one of the GNSS, the GPS, or the positioning mechanism.

7. A second User Equipment (UE) in a group, comprising:
a control circuit;
a processor installed in the control circuit; and
a memory installed in the control circuit and operatively coupled to the processor, wherein the processor is configured to execute a program code stored in the memory to perform operations for performing Hybrid Automatic Repeat Request (HARQ) feedback in response to a groupcast sidelink transmission for the group, the operations comprising:
receiving, in a first slot, a first sidelink control information (SCI) and a second SCI from a first UE in the group, wherein:
the groupcast sidelink transmission is scheduled by the first SCI and the second SCI; and
the second SCI is indicative of a location indication, associated with a location of the first UE, a communication range, and granularity information for at least one of interpreting or processing the location of the first UE, wherein the location indication comprises a ZONE ID of the first UE and wherein the granularity information and the location indication are indicated by different SCI fields in the second SCI;
determining a Physical Sidelink Feedback Channel (PSFCH) resource based upon the first SCI;
determining whether a location information of the second UE is available to the second UE; and
one of:
determining to not transmit a non-acknowledgement (NACK) indication on the PSFCH resource based upon a combination of the location information of the second UE being available to the second UE, the groupcast sidelink transmission not being successfully decoded, and the second UE being outside the communication range from the first UE; or
determining to transmit the NACK indication on the PSFCH resource based upon one of:
a combination of the location information of the second UE not being available to the second UE and the groupcast sidelink transmission not being successfully decoded; or
a combination of the location information of the second UE being available to the second UE, the groupcast sidelink transmission not being successfully decoded, and the second UE being within the communication range from the first UE.

8. The second UE of claim 7, wherein:
the second UE is outside the communication range from the first UE.

9. The second UE of claim 7, wherein:
the first SCI is a first-stage SCI and the second SCI is a second-stage SCI.

10. The second UE of claim 7, wherein:
the NACK indication is associated with a decoding result of the groupcast sidelink transmission.

11. The second UE of claim 7, the operations comprising:
determining the location of the first UE based upon the ZONE ID and the granularity information indicated by the second SCI.

12. The second UE of claim 7, the operations comprising:
determining the location information of the second UE using at least one of a Global Navigation Satellite System (GNSS), a Global Positioning System (GPS), or a positioning mechanism.

13. The second UE of claim 7, wherein:
the location information of the second UE is available to the second UE when the second UE is able to determine the location information via at least one of a Global Navigation Satellite System (GNSS), a Global Positioning System (GPS), or a positioning mechanism.

14. A non-transitory computer-readable medium comprising processor-executable instructions that when executed by a second User Equipment (UE) cause performance of operations for performing Hybrid Automatic Repeat Request (HARQ) feedback in response to a groupcast sidelink transmission for a group, the operations comprising:
receiving, in a first slot, a first sidelink control information (SCI) and a second SCI from a first UE, wherein:
the groupcast sidelink transmission is scheduled by the first SCI and the second SCI; and
the second SCI is indicative of a location indication, associated with a location of the first UE, a communication range, and granularity information for at least one of interpreting or processing the location of the first UE, wherein the location indication comprises a ZONE ID of the first UE and wherein the granularity information and the location indication are indicated by different SCI fields in the second SCI;
determining a Physical Sidelink Feedback Channel (PSFCH) resource based upon the first SCI;
determining whether a location information of the second UE is available to the second UE; and
one of:
determining to not transmit a non-acknowledgement (NACK) indication on the PSFCH resource based upon a combination of the location information of the second UE being available to the second UE, the groupcast sidelink transmission not being successfully decoded, and the second UE being outside the communication range from the first UE; or
determining to transmit the NACK indication on the PSFCH resource based upon one of:
a combination of the location information of the second UE not being available to the second UE and the groupcast sidelink transmission not being successfully decoded; or
a combination of the location information of the second UE being available to the second UE, the groupcast sidelink transmission not being successfully decoded, and the second UE being within the communication range from the first UE.

15. The non-transitory computer-readable medium of claim 14, wherein:
the location information of the second UE is available to the second UE when the second UE is able to determine the location information via at least one of a Global Navigation Satellite System (GNSS), a Global Positioning System (GPS), or a positioning mechanism.

16. A method of a second User Equipment (UE) for performing Hybrid Automatic Repeat Request (HARQ) feedback in response to groupcast sidelink transmission for a group, the method comprising:
receiving, in a first slot, a first sidelink control information (SCI) and a second SCI from a first UE, wherein:
the groupcast sidelink transmission is scheduled by the first SCI and the second SCI; and
the second SCI is indicative of a location indication, associated with a location of the first UE, a communication range, and granularity information for at least one of interpreting or processing the location of the first UE, wherein the location indication comprises a ZONE ID of the first UE and wherein the granularity information and the location indication are indicated by different SCI fields in the second SCI;
determining a Physical Sidelink Feedback Channel (PSFCH) resource based upon the first SCI;
if a location information of the second UE is not available to the second UE, determining, by the second UE, whether to transmit a non-acknowledgement (NACK) indication on the PSFCH resource based upon whether the groupcast sidelink transmission is not successfully decoded; and
transmitting the NACK indication on the PSFCH resource responsive to determining that the location information of the second UE is not available to the second UE and the groupcast sidelink transmission is not successfully decoded.

17. The method of claim 16, wherein:
the second UE is outside the communication range from the first UE.

18. The method of claim 16, wherein:
the first UE and the second UE are in the group.

19. The method of claim 16, wherein:
the first SCI is a first-stage SCI and the second SCI is a second-stage SCI.

20. The method of claim 16, wherein:
the NACK indication is associated with a decoding result of the groupcast sidelink transmission.

21. The method of claim 16, wherein the location indication comprises a ZONE ID of the first UE, the method comprising:
determining the location of the first UE based upon the ZONE ID and the granularity information indicated by the second SCI.

22. The method of claim 16, wherein:
the location information of the second UE is not available to the second UE when the second UE is not able to determine the location information via at least one of a Global Navigation Satellite System (GNSS), a Global Positioning System (GPS), or a positioning mechanism.

* * * * *